United States Patent
Zhuo et al.

(10) Patent No.: US 12,402,063 B2
(45) Date of Patent: Aug. 26, 2025

(54) METHOD FOR UPDATING OR RELEASING BACKHAUL CONFIGURATION INFORMATION AND RELATED PRODUCT

(71) Applicant: HUAWEI TECHNOLOGIES CO., LTD., Guangdong (CN)

(72) Inventors: Yibin Zhuo, Shenzhen (CN); Yuanping Zhu, Shanghai (CN); Jing Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 18/173,183

(22) Filed: Feb. 23, 2023

(65) Prior Publication Data

US 2023/0199615 A1 Jun. 22, 2023

Related U.S. Application Data

(63) Continuation of application No. PCT/CN2020/111931, filed on Aug. 27, 2020.

(51) Int. Cl.
*H04W 40/24* (2009.01)
*H04W 40/02* (2009.01)

(52) U.S. Cl.
CPC ......... *H04W 40/248* (2013.01); *H04W 40/02* (2013.01)

(58) Field of Classification Search
None
See application file for complete search history.

(56) References Cited

U.S. PATENT DOCUMENTS

| 2021/0168667 | A1* | 6/2021 | Byun | H04W 36/0011 |
| 2021/0360439 | A1* | 11/2021 | Akl | H04W 76/10 |
| 2022/0104088 | A1* | 3/2022 | Byun | H04W 36/0235 |

(Continued)

FOREIGN PATENT DOCUMENTS

| CN | 110035453 A | 7/2019 |
| CN | 110636570 A | 12/2019 |

(Continued)

OTHER PUBLICATIONS

ZTE, Discussion on IAB link switch and topology adaptation. 3GPP TSG-RAN WG2#103, Gothenburg, Sweden, Aug. 20-24, 2018, R2-1812467, 5 pages.

(Continued)

*Primary Examiner* — Brian S Roberts

(57) ABSTRACT

A first node sends, after determining that all data packets from a migrating IAB node are received, first indication information to a source IAB donor CU. The first node is an upstream IAB node of a source parent node of the migrating IAB node or is a source IAB donor DU, the source IAB donor CU is an IAB donor CU connected to the migrating IAB node before migration, and the source IAB donor DU is an IAB donor DU connected to the migrating IAB node before the migration. The first node receives second indication information from the source IAB donor CU. The first node updates or releases, based on the second indication information, backhaul configuration information that corresponds to the migrating IAB node and that is on a backhaul link between the first node and a child node of the first node.

19 Claims, 11 Drawing Sheets

(56) References Cited

U.S. PATENT DOCUMENTS

| | | | | |
|---|---|---|---|---|
| 2023/0098159 A1* | 3/2023 | Liu | ...................... | H04W 40/22 |
| | | | | 370/331 |
| 2023/0156848 A1* | 5/2023 | Zhu | ................... | H04W 74/0833 |
| | | | | 370/329 |
| 2023/0232294 A1* | 7/2023 | Teyeb | ................... | H04W 36/08 |
| | | | | 370/331 |

FOREIGN PATENT DOCUMENTS

| | | |
|---|---|---|
| CN | 110719614 A | 1/2020 |
| WO | 2019246446 A1 | 12/2019 |

OTHER PUBLICATIONS

3GPP TS 38.401 V16.2.0 (Jul. 2020), 3rd Generation Partnership Project; Technical Specification Group Radio Access Network; NG-RAN; Architecture description(Release 16), 77 pages.

International Search Report and Written Opinion issued in PCT/CN2020/111931, dated May 19, 2021, 11 pages.

Extended European Search Report dated Sep. 12, 2023 issued for European Application No. 20950755.7 (7 pages).

\* cited by examiner

METHOD FOR UPDATING OR RELEASING BACKHAUL CONFIGURATION INFORMATION AND RELATED PRODUCT

CROSS-REFERENCE TO RELATED APPLICATION

This application is a continuation of International Application No. PCT/CN2020/111931, filed on Aug. 27, 2020, the disclosure of which is hereby incorporated by reference in its entirety.

TECHNICAL FIELD

This disclosure relates to the field of communication technologies, and in particular, to a method for updating or releasing backhaul configuration information and a related product.

BACKGROUND

The 5th generation mobile communication (5G) poses stricter requirements on a network performance indicator, for example, 1000-fold increase in a capacity indicator and wider coverage. In a conventional technology, considering that high-frequency carrier frequency resources are abundant but high-frequency coverage is limited, communication may be performed between a terminal and an access network device through at least one relay node (for example, an integrated access and backhaul (JAB) node). Deploying the IAB node can reduce deployment costs of optical fiber backhaul and improve deployment flexibility. In addition, because for a high-frequency carrier, a propagation characteristic is poor, and attenuation is severe in case of blockage, a current backhaul link is unstable, and consequently data cannot be transmitted in a timely manner. To ensure a service transmission delay, the IAB node migrates to another transmission path to continue the data transmission. When the IAB node performs the migration, how to ensure lossless transmission of user data is a technical problem to be resolved by a person skilled in the art.

SUMMARY

Embodiments of this disclosure disclose a method for updating or releasing backhaul configuration information and a related product, to avoid a data loss of an IAB node during migration and improve backhaul configuration resource utilization.

According to a first aspect, an embodiment of this disclosure discloses a method for updating or releasing backhaul configuration information. This method includes: A first node sends, after determining that all data packets from a migrating IAB node are received, first indication information to a source IAB donor central unit CU. The first node is an upstream IAB node of a source parent node of the migrating IAB node or is a source IAB donor distributed unit DU, the source IAB donor CU is an IAB donor CU connected to the migrating IAB node before migration, and the source IAB donor DU is an IAB donor DU connected to the migrating IAB node before the migration. The first node receives second indication information from the source IAB donor CU. The first node updates or releases, based on the second indication information backhaul configuration information, that corresponds to the migrating IAB node and that is on a backhaul link between the first node and a child node of the first node. It can be appreciated that the first node updates or releases the backhaul configuration information in time by using the indication information, so that backhaul configuration resource utilization can be improved. In addition, the backhaul configuration information is updated or released only after all the data packets from the migrating IAB node are received, so that data loss of the IAB node during the migration can be avoided.

In a possible example, the first node starts or restarts a first timer when the first node receives a first data packet from the migrating IAB node; and if the first node receives no other data packet from the migrating IAB node in a running period of the first timer, the first node determines that all the data packets from the migrating IAB node are received. In this way, whether all the data packets from the migrating IAB node are received is determined based on the timer, so that the first node can be prevented from being in a state of waiting to receive the data packet from the migrating IAB node, and backhaul configuration resource utilization can be improved.

In a possible example, the first node receives third indication information from the child node of the first node; and the first node determines, based on the third indication information, that all the data packets from the migrating IAB node are received. In this way, that all the data packets from the migrating IAB node are received is determined based on the indication information, so that identification efficiency and accuracy can be improved.

In a possible example, the first node is the upstream IAB node of the source parent node of the migrating IAB node. The first node sends fourth indication information to a parent node of the first node after sending all the data packets from the migrating IAB node to the parent node of the first node. In this way, the parent node of the first node may determine, based on the indication information, that all the data packets from the migrating IAB node are received, so that identification efficiency is improved.

In a possible example, the first node receives a data packet, where the data packet includes a first backhaul adaptation protocol BAP route identifier. The first node receives first routing configuration information from the source IAB donor CU, where the first routing configuration information includes the first BAP route identifier, and a path of the first BAP route identifier includes a path between the migrating IAB node and the source parent node of the migrating IAB node. The first node determines, based on the first BAP route identifier and the first routing configuration information in the data packet, that the data packet is the data packet from the migrating IAB node. In this way, whether the data packet is from the migrating IAB node is determined based on the BAP route identifier, so that identification efficiency and accuracy can be improved.

In a possible example, the first node receives a data packet, where the data packet includes an identifier of the migrating IAB node. The first node determines, based on the identifier of the migrating IAB node, that the data packet is the data packet from the migrating IAB node. In this way, whether the data packet is from the migrating IAB node is directly determined based on the identifier of the migrating IAB node, so that identification efficiency and accuracy can be improved.

According to a second aspect, an embodiment of this disclosure provides another method for updating or releasing backhaul configuration information. This method includes: A source IAB donor CU receives first indication information from a first node. The first node is an upstream IAB node of a source parent node of a migrating IAB node or is a source IAB donor DU, the source IAB donor CU is an IAB donor CU connected to the migrating IAB node before migration, the source IAB donor DU is an IAB donor DU connected to the migrating IAB node before the migration, and the first indication information is used to determine that the first node receives all data packets from the migrating IAB node. The source IAB donor CU sends second indication information to the first node. The second indication information is used to update or release backhaul configuration information that corresponds to the migrating IAB node and that is on a backhaul link between the first node and a child node of the first node. It can be appreciated that, after the first node has received all the data packets from the migrating IAB node, the source IAB donor CU receives the first indication information from the first node, and then sends, to the first node, the second indication information used to update or release the backhaul configuration information, so that data loss of the IAB node during the migration can be avoided and backhaul configuration resource utilization can be improved.

In a possible example, the first node is the source IAB donor DU. The source IAB donor CU sends fifth indication information to the upstream IAB node of the source parent node of the migrating IAB node. The fifth indication information is used to update or release backhaul configuration information that corresponds to the migrating IAB node and that is on a backhaul link between the upstream IAB node and a child node of the upstream IAB node. It can be appreciated that, after the source IAB donor DU determines that the data packet from the migrating IAB node is received, the source IAB donor CU uniformly updates or releases backhaul configuration information that corresponds to the migrating IAB node and that is on a backhaul link between each node and a child node of the node. This reduces identification time and helps improve backhaul configuration resource utilization.

In a possible example, the source IAB donor CU sends first routing configuration information to the first node. The first routing configuration information includes a first BAP route identifier, and a path of the first route identifier includes a path between the migrating IAB node and a parent node of the migrating IAB node. In this way, whether the data packet is from the migrating IAB node is determined based on the BAP route identifier, so that identification efficiency and accuracy can be improved.

According to a third aspect, an embodiment of this disclosure provides a node. The node is an upstream IAB node of a source parent node of a migrating IAB node or is a source IAB donor DU. The source IAB donor DU is an IAB donor DU connected to the migrating IAB node before migration. The node includes: a processing unit, configured to determine that all data packets from the migrating IAB node are received; and a communication unit, configured to: send first indication information to a source IAB donor CU, where the source IAB donor CU is an IAB donor CU connected to the migrating IAB node before the migration; and receive second indication information from the source IAB donor CU. The processing unit is further configured to update or release, based on the second indication information, backhaul configuration information that corresponds to the migrating IAB node and that is on a backhaul link between a first node and a child node of the first node. It can be appreciated that the first node updates or releases the backhaul configuration information in time by using the indication information, so that backhaul configuration resource utilization can be improved. In addition, the backhaul configuration information is updated or released only after all the data packets from the migrating IAB node are received, so that data loss of the IAB node during the migration can be avoided.

In a possible example, the processing unit is further configured to: start or restart a first timer when the communication unit receives a first data packet from the migrating IAB node; and if no other data packet from the migrating IAB node is received in a running period of the first timer, determine that all the data packets from the migrating IAB node are received. In this way, whether all the data packets from the migrating IAB node are received is determined based on the timer, so that a waste of resources can be avoided.

In a possible example, the communication unit is further configured to receive third indication information from the child node of the first node; and the processing unit is further configured to determine, based on the third indication information, that all the data packets from the migrating IAB node are received. In this way, that all the data packets from the migrating IAB node are received is determined based on the indication information, so that identification accuracy can be improved.

In a possible example, the first node is the upstream IAB node of the source parent node of the migrating IAB node. The communication unit is further configured to send fourth indication information to a parent node of the first node after sending all the data packets from the migrating IAB node to the parent node of the first node. In this way, the parent node of the first node may determine, based on the indication information, that all the data packets from the migrating IAB node are received, so that identification efficiency is improved.

In a possible example, the communication unit is further configured to: receive a data packet, where the data packet includes a first BAP route identifier; and receive first routing configuration information from the source IAB donor CU. The first routing configuration information includes the first BAP route identifier, and a path of the first BAP route identifier includes a path between the migrating IAB node and the source parent node of the migrating IAB node. The processing unit is further configured to determine, based on the first BAP route identifier and the first routing configuration information in the data packet, that the data packet is the data packet from the migrating IAB node. In this way, whether the data packet is from the migrating IAB node is determined based on the BAP route identifier, so that identification efficiency and accuracy can be improved.

In a possible example, the communication unit is further configured to receive a data packet, where the data packet includes an identifier of the migrating IAB node. The processing unit is further configured to determine, based on the identifier of the migrating IAB node, that the data packet is the data packet from the migrating IAB node. In this way, whether the data packet is from the migrating IAB node is directly determined based on the identifier of the migrating IAB node, so that identification efficiency and accuracy can be improved.

According to a fourth aspect, an embodiment of this disclosure provides a node. The node is an IAB donor CU connected to a migrating IAB node before migration. The node includes a communication unit, configured to receive first indication information from a first node. The first node is an upstream IAB node of a source parent node of the migrating IAB node or is a source IAB donor DU. The source IAB donor DU is an IAB donor DU connected to the migrating IAB node before the migration. The first indication information is used to determine that the first node receives all data packets from the migrating IAB node. The communication unit is further configured to send second indication information to the first node. The second indication information is used to update or release backhaul configuration information that corresponds to the migrating IAB node and that is on a backhaul link between the first node and a child node of the first node. It can be appreciated that, after the first node has received all the data packets from the migrating IAB node, the source IAB donor CU receives the first indication information from the first node, and then sends, to the first node, the second indication information used to update or release the backhaul configuration information, so that data loss of the IAB node during the migration can be avoided and backhaul configuration resource utilization can be improved.

In a possible example, the first node is the source IAB donor DU. The communication unit is further configured to send fifth indication information to the upstream IAB node of the source parent node of the migrating IAB node. The fifth indication information is used to update or release backhaul configuration information that corresponds to the migrating IAB node and that is on a backhaul link between the upstream IAB node and a child node of the upstream IAB node. It can be appreciated that, after the source IAB donor DU determines that the data packet from the migrating IAB node is received, the source IAB donor CU uniformly updates or releases backhaul configuration information that corresponds to the migrating IAB node and that is on a backhaul link between each node and a child node of the node. This reduces identification time and helps improve backhaul configuration resource utilization.

In a possible example, the communication unit is further configured to send first routing configuration information to the first node. The first routing configuration information includes a first BAP route identifier, and a path of the first route identifier includes a path between the migrating IAB node and a parent node of the migrating IAB node. In this way, whether the data packet is from the migrating IAB node is determined based on the BAP route identifier, so that identification efficiency and accuracy can be improved.

According to a fifth aspect, this disclosure provides a network device, including a processor, a memory, a transceiver, a network interface, and an antenna. The network device is configured to perform the method in any one of the foregoing aspects.

According to a sixth aspect, this disclosure provides another network device, including a processor, and a memory and a communication interface that are connected to the processor. The memory is configured to store one or more programs and is configured to be executed by the processor. The program includes instructions used to perform a step in the method in any one of the foregoing aspects.

According to a seventh aspect, this disclosure provides a chip system. The chip system includes at least one processor, a memory, and an interface circuit. The memory, a transceiver, and the at least one processor are interconnected through a line. The at least one memory stores instructions, and when the instructions are executed by the processor, the method in any one of the foregoing aspects is implemented.

According to an eighth aspect, this disclosure provides a computer-readable storage medium. The computer-readable storage medium stores instructions. When the instructions are run on a computer, the computer is enabled to perform the method in any one of the foregoing aspects.

According to a ninth aspect, this disclosure provides a computer program product. The computer program product is configured to store a computer program. When the computer program is run on a network device, a computer is enabled to perform the method in any one of the foregoing aspects.

According to a tenth aspect, an embodiment of this disclosure provides a communication system, including the nodes described in the third aspect and the fourth aspect.

DESCRIPTION OF EMBODIMENTS

The following describes embodiments of this disclosure with reference to the accompanying drawings in embodiments of this disclosure.

Figure 1:
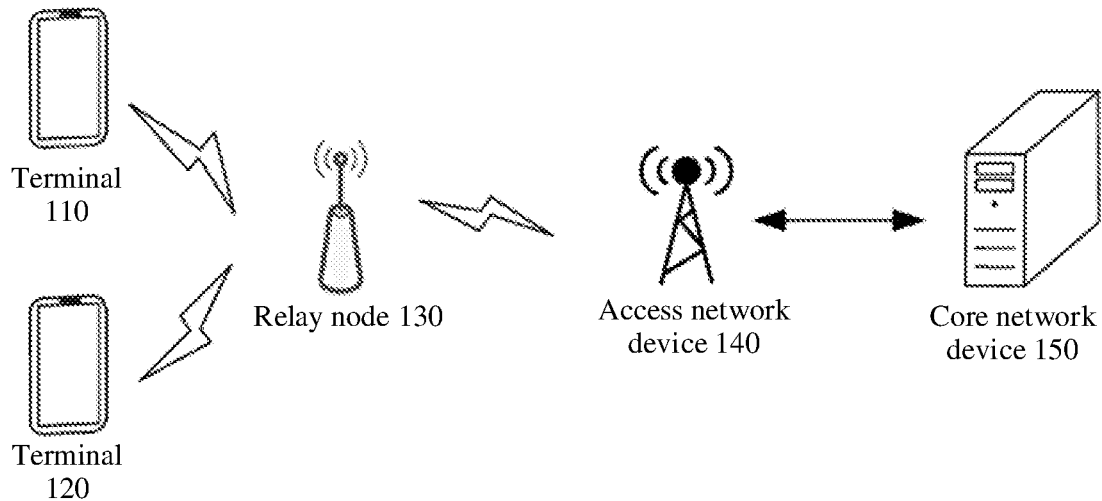
FIG. 1 is a schematic diagram of an architecture of a communication system according to an embodiment of this disclosure.

FIG. 1 is a diagram of an architecture of a communication system 100 according to an embodiment of this disclosure. The communication system 100 includes at least one terminal (for example, a terminal 110 or a terminal 120), at least one relay node (RN) (for example, a relay node 130), at least one access network device (for example, an access network device 140), and at least one core network device (for example, a core network device 150).

In the foregoing communication system 100, the terminal is connected to the relay node in a wireless manner, and the relay node is connected to the access network device in the wireless manner. For example, the relay node may be directly connected to the access network device or indirectly connected to the access network device through another relay node. The access network device 140 may be connected to the core network device in a wired manner or the wireless manner. For example, in FIG. 1, the terminal 110 is connected to the relay node 130 in the wireless manner. The relay node 130 is connected to the access network device 140 directly or through another relay node. The access network device 140 is connected to the core network device 150 in the wired manner.

The communication system in this embodiment of this disclosure may be a communication system that supports a fourth generation (4G) access technology, for example, a long term evolution (LTE) access technology. Alternatively, the communication system may be a communication system that supports a fifth generation (5G) access technology, for example, a new radio (NR) access technology. Alternatively, the communication system may be a communication system that supports a plurality of wireless technologies, for example, a communication system that supports both an LTE technology and an NR technology. In addition, the communication system may be used in a future-oriented communication technology.

The terminal in this embodiment of this disclosure may be a device that provides voice or data connectivity for a user, and the terminal may be referred to as user equipment (UE), a mobile station, a subscriber unit, a station, terminal equipment (TE), and the like. The terminal may be a cellular phone, a personal digital assistant (PDA), a wireless modem, a handheld device, a laptop computer, a cordless phone, a wireless local loop (WLL) station, a pad, and the like. With development of wireless communication technologies, a device that can access a wireless communication network, communicate with a wireless network side, or communicate with another object through a wireless network may be the terminal in this embodiment of this disclosure. For example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. The terminal may be fixed or movable.

The access network device in this embodiment of this disclosure may be a device that is configured to support the terminal in accessing the communication system and that is on an access network side. The access network device may be referred to as a base station (BS), for example, an evolved node base station (eNB) in a 4G access technology communication system, a next generation node base station (gNB) in a 5G access technology communication system, a transmission reception point (TRP), or an access point (AP). Alternatively, the access network device may be referred to as a donor node, an IAB donor, a donor IAB, a donor, a donor gNB (DgNB), or the like. In this embodiment of this disclosure, an example in which the access network device is the IAB donor is used for description.

The core network device in this embodiment of this disclosure may be connected to one or more access network devices, and may provide the terminal in the system with one or more functions of session management, access authentication, internet protocol (JP) address allocation, and data transmission. For example, the core network device may be a mobility management entity (MME) or a serving gateway (SGW) in the communication system with the 4G access technology, or an access and mobility management function (AMF) network element or a user plane function (UPF) network element in the communication system with the 5G access technology. The core network device may be referred to as a core network element.

The relay node in this embodiment of this disclosure may be a node that provides a radio backhaul service, and the radio backhaul service is a data and/or signaling backhaul service provided through a radio backhaul link. In one aspect, the relay node may provide a radio access service for the terminal through an access link (AL). In another aspect, the relay node may be connected to the access network device through a one-hop or multi-hop backhaul link (BL). Therefore, the relay node may implement data and/or signaling forwarding between the terminal and the access network device, so that coverage of the communication system is expanded.

The relay node may have different names in different communication systems. For example, the relay node may be referred to as a radio backhaul node or a radio backhaul device. In a 5G system, the relay node may be referred to as an integrated access and backhaul node (JAB node). Certainly, in a future communication system, the relay node may further have different names. This is not limited herein.

Figure 2:
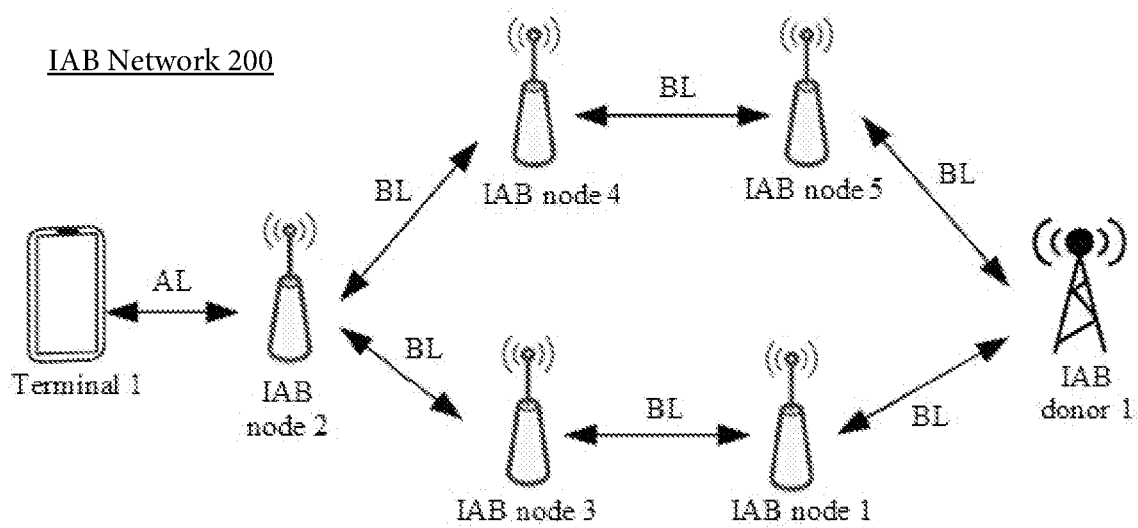
FIG. 2 is a schematic diagram of an architecture of a first IAB network according to an embodiment of this disclosure.

In this embodiment of this disclosure, that the relay node is an IAB node and the access network device is an IAB donor is used to further describe the communication system 100 corresponding to the terminal, the relay node, and the access network device in FIG. 1. The communication system 100 may be referred to as an IAB network. With reference to FIG. 2, FIG. 2 is a schematic diagram of an IAB network 200 according to an embodiment of this disclosure.

In FIG. 2, a terminal 1 may correspond to the terminal 110 in FIG. 1, an IAB node 2, an IAB node 3, an IAB node 1, an IAB node 4, and an IAB node 5 correspond to the relay node 130 shown in FIG. 1, and an IAB donor 1 may correspond to the access network device 140 in FIG. 1. The IAB donor 1 may be connected (for example, connected in a wired manner) to the core network device 150 in FIG. 1 (where this not shown in FIG. 2).

The IAB network 200 includes one or more terminals (for example, the terminal 1), one or more IAB nodes (for example, the IAB node 2, the IAB node 3, the IAB node 1, the IAB node 4, and the IAB node 5), and one or more donor nodes (for example, the IAB donor 1). The terminal may be connected to the one or more IAB nodes in a wireless manner, each IAB node may be connected to one or more other IAB nodes in a wireless manner, and the one or more IAB nodes may be connected to the one or more donor nodes in a wireless manner. In a future possibility, the one or more IAB nodes may alternatively be connected to each other in the wireless manner. This is not limited in this disclosure.

It may be understood that, in the IAB network, one transmission path between the terminal and the donor node may include one or more IAB nodes. Each IAB node needs to maintain a radio backhaul link to a parent node, and further needs to maintain a radio link to a child node. If one IAB node is a node accessed by a terminal, a radio access link exists between the IAB node and a child node (namely, the terminal). In other words, the link between the terminal and the IAB node may be referred to as an access link. If one IAB node is a node that provides a backhaul service for a terminal under another IAB node, a radio backhaul link exists between the IAB node and a child node (namely, the another IAB node). In other words, a link between the IAB nodes and a link between the IAB node and a donor node may be referred to as backhaul links.

For example, with reference to FIG. 2, the terminal 1 accesses the IAB node 2 through a radio access link, the IAB node 2 is connected to the IAB node 3 through a radio backhaul link, the IAB node 3 is connected to the IAB node 1 through a radio backhaul link, and the IAB node 1 is connected to the IAB donor 1 through a radio backhaul link.

To ensure service transmission reliability, in an IAB network, multi-hop IAB node networking and multi-connectivity IAB node networking are supported. Therefore, there may be a plurality of transmission paths between a terminal and an IAB donor. On one path, there are determined hierarchical relationships between IAB nodes and between the IAB node and a donor node serving the IAB node. Each IAB node considers, as a parent node, a node that provides an access service for the IAB node. Correspondingly, each IAB node may be considered as a child node of the parent node of the IAB node.

For example, with reference to FIG. 2, a parent node of the IAB node 1 and the IAB node 5 is the IAB donor 1, the IAB node 1 is a parent node of the IAB node 2, the IAB node 2 is a parent node of the IAB node 3 and the IAB node 4, the IAB node 2 is a parent node of the terminal 1, and the IAB node 5 is a parent node of the IAB node 4.

An uplink data packet of a terminal may be transmitted to a donor node through one or more IAB nodes, and then is sent by the donor node to a mobile gateway device (for example, a user plane function (UPF) network element in a 5G network). After the donor node receives a downlink data packet from the mobile gateway device, the donor node sends the downlink data packet to the terminal through the one or more IAB nodes.

For example, with reference to FIG. 2, there are two available paths for data transmission between the terminal 1 and the IAB donor 1. A path 1 is: the terminal 1←→the IAB node 2←→the IAB node 3←→the IAB node 1←→the IAB donor 1, and a path 2 is: the terminal 1←→the IAB node 2←→the IAB node 4←→the IAB node 5←→the IAB donor 1.

In the IAB network, on one transmission path, an IAB node accessed by the terminal may be referred to as an access IAB node, and another IAB node on the transmission path is referred to as an intermediate IAB node. The intermediate IAB node may provide a backhaul service for the terminal.

For example, with reference to FIG. 2, in the path 1 "the terminal 1←→the IAB node 2←→the IAB node 3←→the IAB node 1←→the IAB donor 1", the IAB node 2 is an access IAB node, and the IAB node 3 and the IAB node 1 are intermediate IAB nodes. The IAB node 3 provides an access service for the IAB node 2, and/or provides a backhaul service for the terminal 1. The IAB node 1 provides an access service for the IAB node 3, and/or provides a backhaul service for the terminal 1.

It should be noted that, an IAB node is an access IAB node for a terminal that accesses the IAB node. For a terminal that accesses another IAB node, the IAB node is an intermediate IAB node. Therefore, whether an IAB node is an access IAB node or an intermediate IAB node is not fixed, and needs to be determined based on a specific application scenario.

For example, if a terminal 2 accesses the IAB node 3, for the terminal 1, the IAB node 3 is an intermediate IAB node, and for the terminal 2, the IAB node 3 is an access IAB node.

In the IAB network, one or more IAB nodes and one or more terminals served by an IAB node may be referred to as descendant nodes or downstream nodes of the IAB node. It may be understood that the downstream nodes may include the IAB node served by the IAB node, for example, including a child node, a grandchild node, and a descendant node of the grandchild node, and the terminal accessing the IAB node, for example, including terminals accessing the child node, the grandchild node, and the descendant node of the grandchild node.

In the IAB network, one or more IAB nodes that provide services for an IAB node may be referred to as ancestor nodes or upstream IAB nodes of the IAB node. It may be understood that the upstream IAB node may include an IAB node between the IAB node and an IAB donor, for example, include a parent node, a grandparent node, and a parent node of the grandparent node.

For example, with reference to FIG. 2, downstream nodes of the IAB node 1 include the terminal 1, the IAB node 2, and the IAB node 3. Upstream IAB nodes of the IAB node 2 include the IAB node 3 and the IAB node 1.

The foregoing IAB network is merely an example. In an IAB network with multi-hop and multi-connectivity combined, there are more other possibilities in the IAB network. For example, a donor node and an IAB node served by another donor node form dual connectivity to serve a terminal. The possibilities are not listed one by one herein.

It should be noted that FIG. 2 is described by using the IAB network as an example. Content in FIG. 2 is also applicable to a relay network other than the IAB network, and "IAB" in FIG. 2 may be replaced with "relay". For example, the IAB node 2 may be replaced with a relay node 2, the IAB node 3 may be replaced with a relay node 3, the IAB node 1 may be replaced with a relay node 1, and the IAB donor 1 may be replaced with a donor node 1. For descriptions of a connection relationship between network elements, an access link, a backhaul link, a parent node, a child node, an access relay node, an intermediate access node, and the like in the relay network, refer to descriptions of the IAB network 200.

Figure 3:
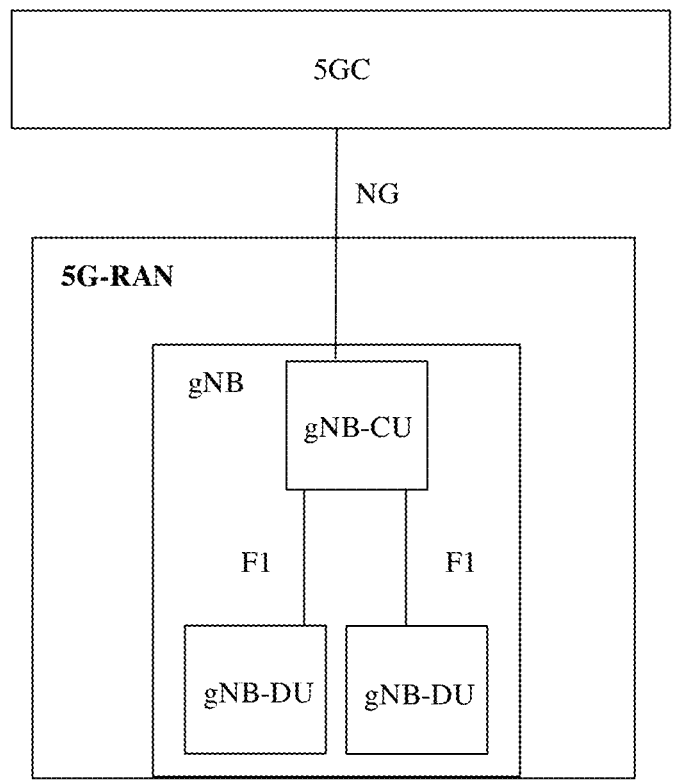
FIG. 3 is a schematic diagram of a CU-DU split architecture according to an embodiment of this disclosure.

FIG. 3 is a schematic diagram of a CU-DU split architecture according to an embodiment of this disclosure. The access network device in FIG. 1 or the IAB donor 1 in FIG. 2 may use the CU-DU split architecture. The following provides descriptions with reference to FIG. 3.

Because a future access network may be implemented by using a cloud radio access network (C-RAN) architecture, a gNB may divide a protocol stack architecture and a function of a conventional access network device into two parts: one part is referred to as a central unit (CU), and the other part is referred to as a distributed unit (DU). CU-DU division may be performed by protocol stacks. In a possible manner, a radio resource control (RRC) layer, a service data mapping protocol (SDAP) layer, and a packet data convergence protocol (PDCP) layer are deployed in the CU, and a radio link control (RLC) layer, a media access control (MAC) layer, and a physical (PHY) layer are deployed in the DU.

One CU may be connected to one DU. Alternatively, one CU may be connected to a plurality of DUs. This can reduce costs and facilitate network expansion. In other words, the access network device may include one CU and one or more DUs. The CU is connected to the DU through an F1 interface, and the CU is connected to a core network through a next generation (NG) interface.

For example, with reference to FIG. 3, the gNB includes one gNB-CU and two gNB-DUs. An F1 interface is established between the gNB-CU and each gNB-DU, and an NG interface is established between the gNB-CU and a 5G core network (5GC).

Optionally, the CU may be a form in which a user plane (UP) (which is briefly referred to as a CU-UP in this specification) and a control plane (CP) (which is briefly referred to as a CU-CP in this specification) are separated, that is, the CU includes the CU-CP and the CU-UP.

Figure 4A:
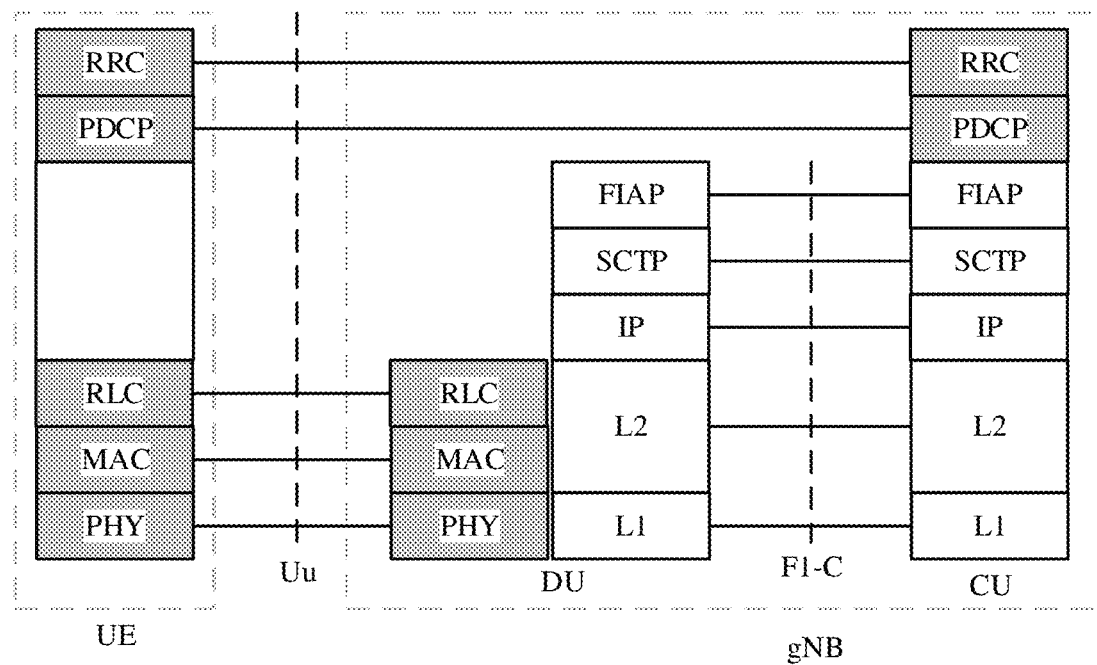
FIG. 4A is a schematic diagram of a control plane protocol stack in a CU-DU split architecture according to an embodiment of this disclosure.
Figure 4B:
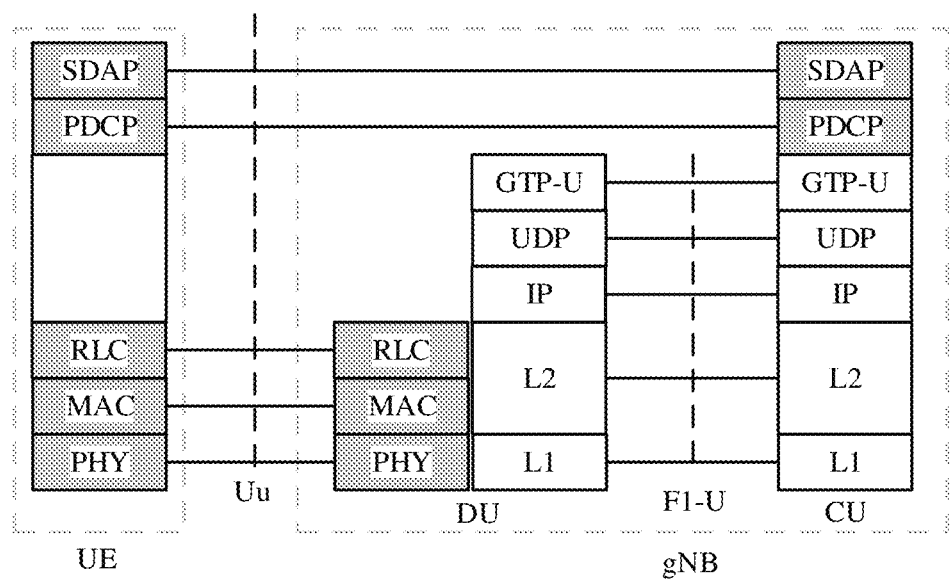
FIG. 4B is a schematic diagram of a user plane protocol stack in a CU-DU split architecture according to an embodiment of this disclosure.

In a single air interface scenario, a terminal may access a CU through a DU. A peer RLC layer, MAC layer, and PHY layer of the UE are located on the DU, and a corresponding PDCP layer, SDAP layer, and PDCP layer of the UE are located on the CU. FIG. 4A is a schematic diagram of a control plane protocol stack in a CU-DU split architecture according to an embodiment of this disclosure. FIG. 4B is a schematic diagram of a user plane protocol stack in a CU-DU split architecture according to an embodiment of this disclosure. The following provides descriptions with reference to FIG. 4A and FIG. 4B.

For a control plane, as shown in FIG. 4A, peers of an RRC layer and a PDCP layer that are of UE are established in a CU. The UE and a DU are connected through a user equipment interface (which may be referred to as a Uu interface). Peers of an RLC layer, a MAC layer, and a PHY layer of the UE are established in the DU. The DU and the CU are connected through an F1-control plane (F1-C) interface. Peers of an F1 application protocol (F1AP) layer, a stream control transmission protocol (SCTP) layer, and an internet protocol (IP) layer, a layer (L) 2 and a layer (L) 1 that are of the DU are established in the CU.

For a user plane, as shown in FIG. 4B, peers of an SDAP layer and the PDCP layer that are of the UE are established in the CU. The UE is connected to the DU through the Uu interface. The peers of the RLC layer, the MAC layer, and the PHY layer of the UE are established in the DU. The DU and the CU are connected through an F1-user plane (F1-U) interface. Peers of a general packet radio service (GPRS) tunneling protocol-user plane (GTP-U) layer, a user datagram protocol (UDP) layer, an IP layer, the L2, and the L1 that are of the DU are established in the CU.

In an IAB network, for an IAB donor, the IAB donor may include a CU (which may be referred to as an IAB donor CU) and a DU (which may be referred to as an IAB donor DU). A function of the IAB donor CU is similar to that of the CU of the gNB described in FIG. 3, and a function of the IAB donor DU is similar to that of the DU of the gNB in FIG. 3.

In the IAB network, for an IAB node, when the IAB node serves as a parent node, the IAB node may play a role similar to an access network device, to provide an access service for a child node of the IAB node, for example, allocate, to the child node of the IAB node through scheduling, an uplink resource for transmitting uplink data. When the IAB node serves as a child node, for a parent node that provides a service for the IAB node, the IAB node may play a role of a terminal, access a wireless network like the terminal, and perform a function of the terminal. The IAB node establishes a connection to the parent node by performing operations such as cell selection and random access, to obtain an uplink resource that is scheduled by the parent node for the IAB node and that is for transmitting uplink data.

By way of example and not limitation, in this embodiment of this disclosure, a role in which the IAB node serves as a terminal is referred to as a mobile terminal (MT) side of the IAB node or an MT function unit (which may be referred to as an IAB-MT or an IAB-UE) of the IAB node, and a role in which the IAB node serves as a device similar to an access network device is referred to as a DU side of the IAB node or a DU function unit (which may be referred to as an IAB-DU) of the IAB node. The IAB-MT and the IAB-DU may be logical division, and functions of the IAB-MT and the IAB-DU are implemented by the IAB node. Alternatively, the IAB-MT and the IAB-DU may be physical division, and the IAB-MT and the IAB-DU may be different physical devices in the IAB node. A function of the IAB-DU is similar to that of the DU of the gNB in FIG. 3, and the IAB-MT has a function of UE and is configured to provide data backhaul.

Figure 5:
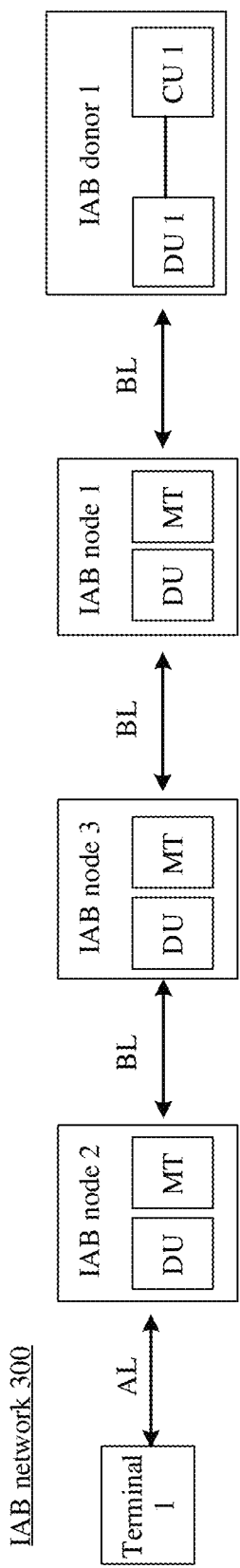
FIG. 5 is a schematic diagram of an architecture of a second IAB network according to an embodiment of this disclosure.

FIG. 5 is a schematic diagram of an IAB network 300 according to an embodiment of this disclosure. The following provides further descriptions with reference to FIG. 5.

As shown in FIG. 5, an IAB donor 1 includes a CU (which may be referred to as an IAB donor CU 1) and a DU (which may be referred to as an IAB donor DU 1). An IAB node 1 includes an MT side (which may be referred to as an IAB1-MT) of the IAB node 1 and a DU side (which may be referred to as an IAB1-DU) of the IAB node 1. An IAB node 2 includes an MT side (which may be referred to as an IAB2-MT) of the IAB node 2 and a DU side (which may be referred to as an IAB2-DU) of the IAB node 2. An IAB node 3 includes an MT side (which may be referred to as an IAB3-MT) of the IAB node 3 and a DU side (which may be referred to as an IAB3-DU) of the IAB node 3.

It should be noted that FIG. 5 is described by using the IAB network as an example. Content in FIG. 5 is also applicable to a relay network other than the IAB network. In this case, the IAB node 2 may be replaced with a relay node 2, the relay node 2 has an MT and a DU. The IAB node 3 may be replaced with a relay node 3, and the relay node 3 has an MT and a DU. The IAB node 1 may be replaced with a relay node 1, and the relay node 1 has an MT and a DU. The IAB donor 1 may be replaced with a donor node 1, and the donor node has a CU and a DU. An MT side of a relay node performs a function of a terminal role of the relay node, and a DU side of the relay node performs a function of an access network device role of the relay node. For details, refer to the content of the IAB network 300. Details are not described herein again.

In the IAB network, peers of a PHY layer, a MAC layer, and an RLC layer that are of a terminal are located on an access IAB node, and peers of a PDCP layer, an SDAP layer, and an RRC layer that are of the UE are located on an IAB donor CU. If the IAB donor CU includes a CP and a UP, a peer of the RRC layer of the UE is located on the CP (namely, a donor-CU-CP) of the IAB donor CU, and peers of the PDCP layer and the SDAP layer that are of the UE are located on the UP (namely, a donor-CU-UP) of the IAB donor CU.

Figure 6A:
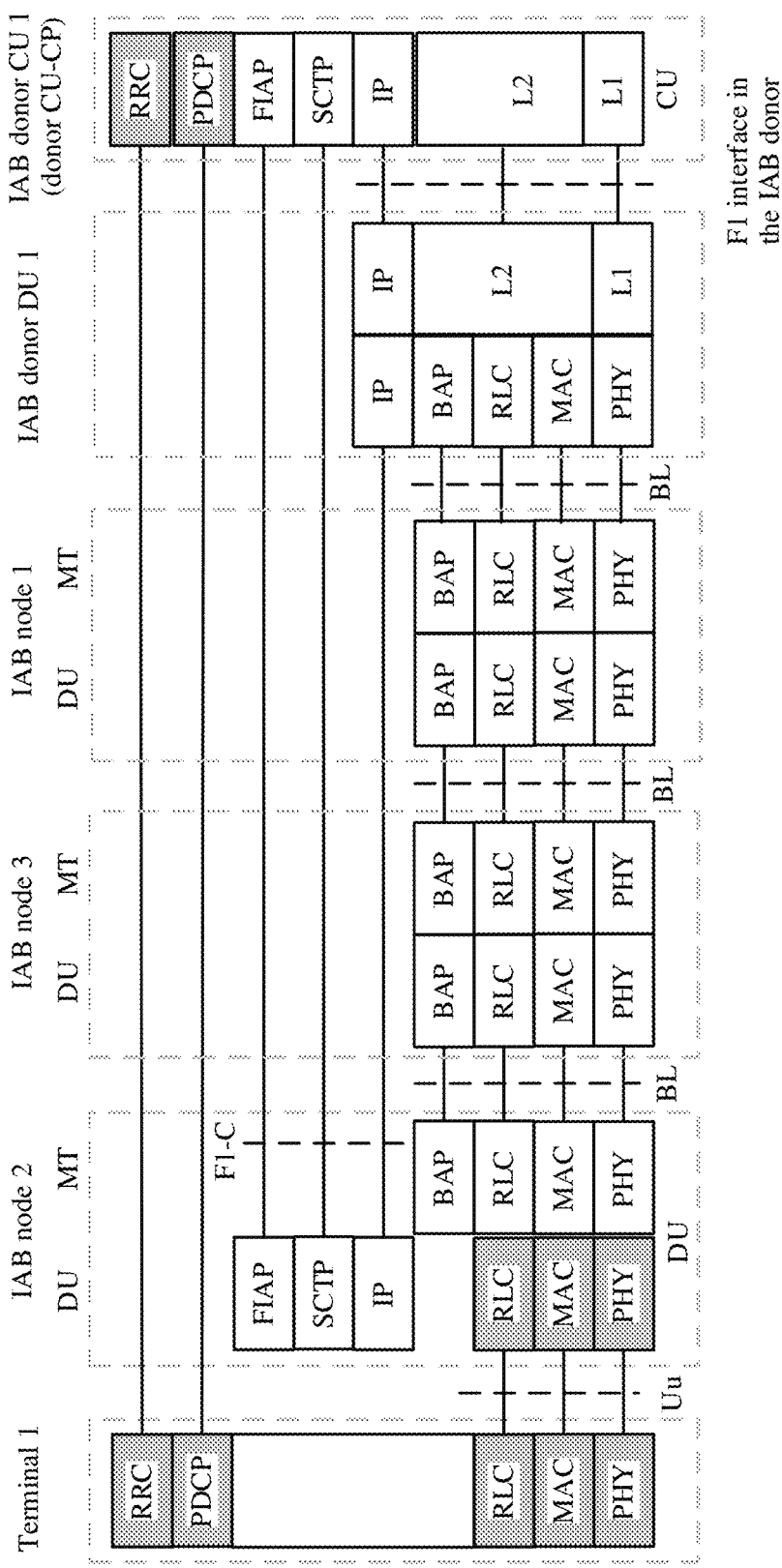
FIG. 6A is a schematic diagram of a control plane protocol stack in a CU-DU split architecture of an IAB network according to an embodiment of this disclosure.
Figure 6B:
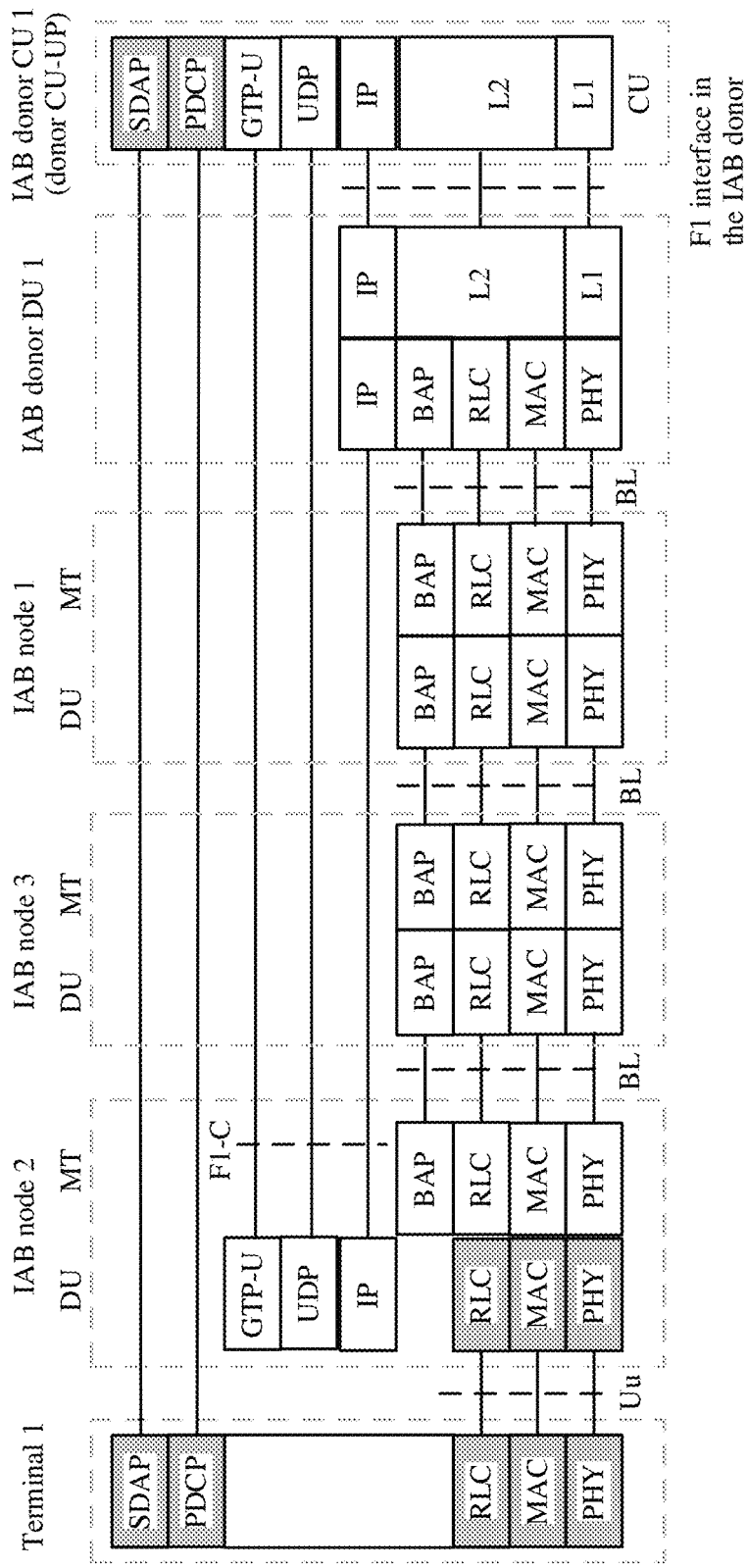
FIG. 6B is a schematic diagram of a user plane protocol stack in a CU-DU split architecture of an IAB network according to an embodiment of this disclosure.

FIG. 6A is a schematic diagram of a control plane protocol stack in an IAB network according to an embodiment of this disclosure. FIG. 6B is a schematic diagram of a user plane protocol stack in an IAB network according to an embodiment of this disclosure. The following provides descriptions with reference to FIG. 6A and FIG. 6B.

For a control plane, as shown in FIG. 6A, a Uu interface is established between a terminal 1 and an IAB2-DU, and peer protocol layers include RLC layers, MAC layers, and PHY layers. An F1-C interface is established between the IAB 2-DU and an IAB donor CU 1, and peer protocol layers include F1AP layers, SCTP layers, and IP layers. An F1 interface in an IAB donor is established between an IAB donor DU 1 and the IAB donor CU 1, and peer protocol layers include IP layers, L2s, and L1s. BLs are established between an IAB node 2 and an IAB node 3, between the IAB node 3 and an IAB node 1, and between the IAB node 1 and the IAB donor DU 1, and peer protocol layers include backhaul adaptation protocol (BAP) layers, RLC layers, MAC layers, and PHY layers. In addition, peers of an RRC layer and a PDCP layer that are of the terminal 1 are established in the IAB donor CU 1, and a peer of an IP layer of the IAB 2-DU is established in the IAB donor DU 1.

It can be appreciated that, compared with a control plane protocol stack of a single air interface, in the control plane protocol stack in the IAB network, a DU of an access IAB node implements functions of a gNB-DU of the single air interface (namely, functions of establishing a peer RLC layer, a peer MAC layer, and a peer PHY layer of the terminal and establishing a peer F1AP layer, a peer SCTP layer, and a peer IP layer of the CU). It may be understood that the DU of the access IAB node in the IAB network implements a function of the gNB-DU of the single air interface, and the IAB donor CU implements a function of a gNB-CU of the single air interface.

It can be seen that, compared with a user plane protocol stack of a single air interface, in the user plane protocol stack in the IAB network, a DU of an IAB access node implements a part of functions of a gNB-DU of the single air interface (namely, functions of establishing a peer RLC layer, a peer MAC layer, and a peer PHY layer of the terminal and establishing a peer GTP—U layer, a peer UDP layer, and a peer IP layer of the IAB donor CU 1). It may be understood that the DU of the IAB access node implements a function of the gNB-DU of the single air interface, and the IAB donor CU implements a function of a gNB-CU of the single air interface.

On the control plane, a PDCP data packet is encapsulated in a GTP-U tunnel between the access IAB node and the IAB donor CU for transmission. The GTP-U tunnel is established on the F1-U interface.

In the IAB network, an IAB node can be migrated. In this embodiment of this disclosure, an IAB node that performs migration is referred to as a migrating IAB node. The migrating IAB node and a descendant node of the migrating IAB node may be used as a group. The group is migrated from a parent node connected to the migrating IAB node before the migration to a parent node connected to the migrating IAB node after the migration. Uplink data of each IAB node in the group is migrated from an IAB donor connected to the migrating IAB node before the migration to an IAB donor connected to the migrating IAB node after the migration.

Optionally, the migrating IAB node may be an access IAB node, or an intermediate IAB node between an access IAB node and an IAB donor.

In this disclosure, the IAB donor connected to the migrating IAB node before the migration is referred to as a source IAB donor. Specifically, the source IAB donor may include a CU and a DU. The CU of the source IAB donor is referred to as a source IAB donor CU, and the DU of the source IAB donor is referred to as a source IAB donor DU.

In this disclosure, the IAB donor connected to the migrating IAB node after the migration is referred to as a target IAB donor. Specifically, the target IAB donor may include a CU and a DU. The CU of the target IAB donor is referred to as a target IAB donor CU, and the DU of the target IAB donor is referred to as a target IAB donor DU.

Optionally, the parent node connected to the migrating IAB node before the migration may be referred to as a source parent node, and the parent node connected to the migrating IAB node after the migration may be referred to as a target parent node. It may be understood that before the migrating IAB node is migrated, the migrating IAB node is connected to the source parent node, and the source parent node provides an access service for the migrating IAB node. After the migrating IAB node is migrated, the migrating IAB node is connected to the target parent node, and the target parent node provides an access service for the migrating IAB node.

The source parent node may be the source IAB donor, or the source parent node is connected to the source IAB donor through m other IAB nodes, where m is an integer greater than or equal to 1. The target parent node may be the target IAB donor, or the target parent node is connected to the target IAB donor through n other IAB nodes, where n is an integer greater than or equal to 1. For example, with reference to FIG. 7, a transmission path before migration is as follows: a terminal 2←→an IAB node 6←→an IAB node 2←→an IAB node 3←→an IAB node 1←→an IAB donor DU 1←→an IAB donor CU 1, and a transmission path after the migration is as follows: the terminal 2←→the IAB node 6←→the IAB node 2←→an IAB node 4←→an IAB node 5←→an IAB donor DU 2←→the IAB donor CU 1. The migrating IAB node is the IAB node 2, the source parent node is the IAB node 3, an upstream IAB node of the source parent node is the IAB node 1, the source IAB donor CU is the IAB donor CU 1, the source IAB donor DU is the IAB donor DU 1, the target IAB donor CU is the IAB donor CU 1, and the target IAB donor DU is the IAB donor DU 2. The migrating IAB node and descendant nodes of the migrating IAB node (namely, the IAB node 2, the IAB node 6, and the terminal 2) may be migrated from an IAB 3 to an IAB 4 together as a group.

Figure 7:
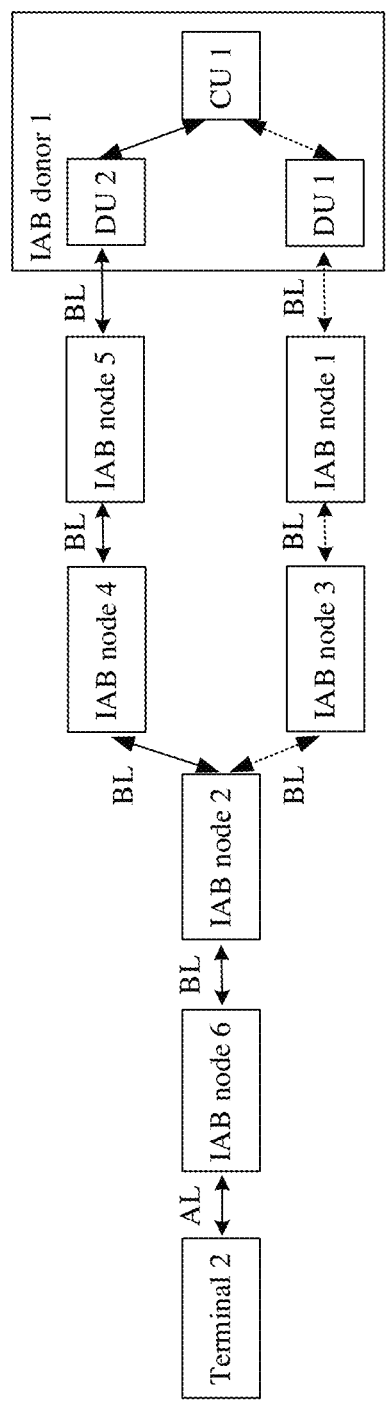
FIG. 7 is a schematic diagram of an architecture of a third IAB network according to an embodiment of this disclosure.

It should be noted that the source IAB donor and the target IAB donor may be the same or different. As shown in FIG. 7, both the source IAB donor and the target IAB donor are the IAB donor CU 1.

In FIG. 7, it needs to be ensured that uplink data that has been sent by the IAB node 2, the IAB node 6, or the terminal 2 to the IAB node 3 can continue to be sent from the IAB node 3 to the IAB node 1, sent to the IAB donor DU 1, and then sent to the IAB donor CU 1. If an IAB donor DU 1 does not receive all the uplink data from the IAB node 2, the IAB node 6, and the terminal 2, or receives a part of the uplink data, and the IAB donor DU 1 updates/releases backhaul configuration information that corresponds to the IAB node 3 and that is on a backhaul link between the IAB donor DU 1 and the IAB node 1, uplink data that is not transmitted to the IAB donor DU 1 may be lost, in other words, the IAB donor CU 1 cannot receive all the uplink data. If the IAB donor CU 1 does not receive the uplink data, or receives a part of the uplink data, and the IAB donor DU 1 updates/releases backhaul configuration information that corresponds to the IAB node 3 and that is on a backhaul link between the IAB donor DU 1 and the IAB node 1, the IAB donor DU cannot receive all the uplink data, and consequently a data loss is caused. If the IAB donor DU 1 does not update/release, or updates/releases excessively late, backhaul configuration information that corresponds to the IAB node 3 and that is on a backhaul link between the IAB donor DU 1 and the IAB node 1 after the IAB donor CU 1 receives all the uplink data, a resource corresponding to the backhaul configuration information is not used, thereby affecting resource utilization of the backhaul link.

To resolve the foregoing technical problems, in this embodiment of this disclosure, after it is determined that all data packets from a migrating IAB node are received, backhaul configuration information corresponding to the migrating IAB node is updated or released in time based on indication information, so that data loss of the IAB node during migration can be avoided, and resource utilization is improved.

Figure 8:
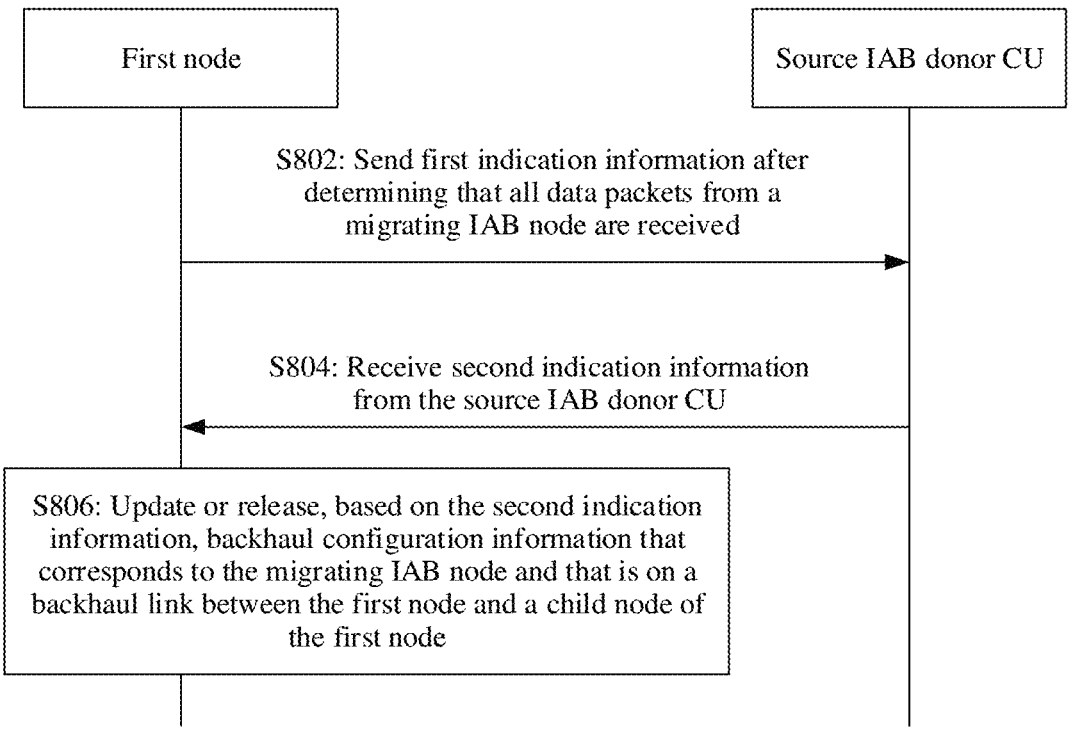
FIG. 8 is a schematic flowchart of a method for updating or releasing backhaul configuration information according to an embodiment of this disclosure.

Specifically, FIG. 8 shows a method for updating or releasing backhaul configuration information according to an embodiment of this disclosure. FIG. 8 uses an IAB network as an example for description. The method is specifically applied to a first node. The first node is an upstream IAB node of a source parent node of a migrating IAB node or a source IAB donor DU. The method includes but is not limited to the following steps.

Step S802: After determining that all data packets from the migrating IAB node are received, the first node sends first indication information to a source IAB donor CU.

The data packet of the migrating IAB node may be a data packet that is from a downstream node of the migrating IAB node and that is received by the migrating IAB node before the migration, or may be a data packet of the migrating IAB node, for example, service data or downloaded data of the migrating IAB node.

For example, with reference to FIG. 7, the migrating IAB node is the IAB node 2, and the data packet of the migrating IAB node may be a data packet sent by a downstream node (namely, the terminal 2 and the IAB node 6) of the IAB node 2 to the IAB node 2 before the IAB node 2 is migrated to a target transmission link (namely, the IAB node 4←→the IAB node 5←→the IAB donor DU 2←--→the IAB donor CU 1). Alternatively, the data packet of the migrating IAB node may include a data packet of the IAB node 2.

A method for determining whether a data packet is from the migrating IAB node is not limited in this disclosure. In a first possible example, the first node receives a data packet, where the data packet includes an identifier of the migrating IAB node. The first node determines, based on the identifier of the migrating IAB node, that the data packet is the data packet from the migrating IAB node.

The identifier of the migrating IAB node may include a network address (for example, an internet protocol (JP) address), a BAP address, a physical address (for example, a media access control address (MAC)), and the like of the migrating IAB node. This is not limited herein.

The identifier of the migrating IAB node may be included in a packet header of the data packet, or may be indicated by indication information in the packet header. For example, a BAP header of a BAP data packet includes a 1-bit indication, to indicate that the BAP data packet is from the migrating IAB node.

The identifier of the migrating IAB node may be obtained by marking the data packet by the migrating IAB node, or may be obtained by marking the data packet by a source parent node of the migrating IAB node. This is not limited herein. It may be understood that, when receiving the data packet from the migrating IAB node, the source parent node may determine that the data packet is from the migrating IAB node. Therefore, the source parent node may mark the data packet received from the migrating IAB node, so that an upstream IAB node of the source parent node may directly determine, based on the identifier, whether the data packet is from the migrating IAB node.

For example, with reference to FIG. 7, if the source parent node (namely, the IAB node 3) of the migrating IAB node labels the data packet sent by the migrating IAB node with the identifier of the migrating IAB node, upstream IAB nodes (the IAB node 1 and the IAB donor DU 1) of the source parent node of the migrating IAB node may directly determine whether a data packet is from the migrating IAB node based on the identifier of the migrating IAB node included in the received data packet.

The identifier of the migrating IAB node may be obtained by marking the data packet received from the migrating IAB node by the migrating IAB node or the source parent node of the migrating IAB node after receiving indication information from the source IAB donor CU. The indication information may be sent by the source IAB donor CU based on a measurement report obtained by the migrating IAB node, and indicates the migrating IAB node to perform migration. The measurement report may include signal quality, transmission efficiency, and the like of a source transmission link corresponding to the migrating IAB node, and another transmission link (which may include the migrating IAB node, or does not include the migrating IAB node). The measurement report may be periodically sent by the migrating IAB node to the source IAB donor CU, or may be returned by the migrating IAB node to the source IAB donor CU after receiving a measurement request from the source IAB donor CU. This is not limited herein. It may be understood that, after indication information of the migrating IAB node is received, the migrating IAB node marks the data packet from the migrating IAB node, or the source parent node of the migrating IAB node marks the data packet from the migrating IAB node. The data packet is not marked when migration is not performed, so that identification efficiency can be improved.

If an access IAB node in a link after the migration remains unchanged, the indication information may further include reconfiguration information of the link after the migration of the migrating IAB node, for example, a system message of a target cell, a resource of a random access channel (RACH), or a resource of a radio link control signal (RLC CH).

It may be understood that in a first possible example, whether the data packet is from the migrating IAB node is determined depending on whether the received data packet includes the identifier of the migrating IAB node, so that identification efficiency and accuracy can be improved.

In a second possible example, the first node receives a data packet, where the data packet includes a first BAP route identifier. The first node receives first routing configuration information from the source IAB donor CU. The first node determines, based on the first BAP route identifier and the first routing configuration information in the data packet, that the data packet is the data packet from the migrating IAB node.

The BAP route identifier includes a BAP address of a target node and a routing path identifier. To be specific, for uplink transmission, the BAP address is a BAP address of an IAB donor DU, and for downlink transmission, the BAP address is a BAP address of an IAB node accessed by a terminal. The packet header of the data packet includes the BAP route identifier to indicate a transmission path of the data packet and a target node that finally receives the data packet.

The first routing configuration information may include the first BAP route identifier, and a path of the first BAP route identifier includes a path between the migrating IAB node and the source parent node of the migrating IAB node. In other words, when a received data packet includes the first BAP route identifier, it may be determined that the data packet is from the migrating IAB node. It should be noted that the first routing configuration information may include one or more first BAP route identifiers.

It may be understood that, in the second possible example, the source IAB donor CU sends the first routing configuration information to the first node. In other words, the source IAB donor CU notifies the first node of all BAP route identifiers related to the backhaul path between the migrating IAB node and the source parent node of the migrating IAB node. Therefore, the first node may determine, based on whether the received data packet includes the first BAP route identifier, whether the data packet is from the migrating IAB node, so that identification efficiency and accuracy are improved.

A method for determining that all the data packets from the migrating IAB node are received is not limited in this disclosure. In a first possible example, the first node starts or restarts a first timer when the first node receives a first data packet from the migrating IAB node; and if the first node receives no other data packet from the migrating IAB node in a running period of the first timer, the first node determines that all the data packets from the migrating IAB node are received.

The first data packet may be the first data packet that is from the migrating IAB node and that is received by the first node, or may be a data packet that is from the migrating IAB node and that is received by the first node again. This is not limited herein. The first timer is started when the first data packet from the migrating IAB node is received for the first time; and the first timer is restarted when the first node receives a data packet from the migrating IAB node again.

The running period of the first timer starts from a time point when the first timer is started to a time point when the first timer expires. The starting means that the first timer starts timekeeping from 0, and the expiration means that timekeeping time of the first timer exceeds timing duration. The timing duration of the first timer is not limited in this disclosure.

For example, it is assumed that the timing duration of the first timer is 1 minute. If the first node receives the first data packet from the migrating IAB node at 11:30, and the first timer is started, at 11:31, when the first node receives no other data packet from the migrating IAB node, the first node determines that all data packets from the migrating IAB node are received.

It may be understood that the first node starts or restarts the first timer when receiving the first data packet from the migrating IAB node. In addition, during the running period of the first timer, the first node detects whether another data packet from the migrating IAB node is received. If the another data packet from the migrating IAB node is not received when the time of the first timer reaches the timing duration, it is determined that a child node of the first node no longer sends the data packet from the migrating IAB node, in other words, it is determined that the first node has received the data packet from the migrating IAB node. Otherwise, the first timer is restarted until no other data packet from the migrating IAB node is received during the running period of the first timer. Whether all the data packets from the migrating IAB node are received is determined based on the timer, so that the first node can be prevented from being in a state of waiting to receive the data packet from the migrating IAB node, and backhaul configuration resource utilization can be improved.

In a second possible example, the first node receives third indication information from the child node of the first node; and the first node determines, based on the third indication information, that all the data packets from the migrating IAB node are received.

The third indication information may indicate that the child node of the first node has determined that all the data packets from the migrating IAB node are received, may indicate that the child node of the first node has received the last data packet of all the data packets from the migrating IAB node, or may indicate that the child node of the first node has sent all the data packets received from the migrating IAB node to the first node. This is not limited herein.

In this embodiment of this disclosure, backhaul configuration information corresponding to the migrating IAB node is configuration information for providing a backhaul service for the migrating IAB node, for example, a BAP route configuration or backhaul radio link control channel (BH RLC CH) configuration information.

It should be noted that one or more backhaul radio link control channels may be included between a node and a child node.

It may be understood that the first node may determine, based on the third indication information sent by the child node of the first node, that all the data packets from the migrating IAB node are received, so that identification efficiency and accuracy can be improved.

In an optional embodiment, the first node is the upstream IAB node of the source parent node of the migrating IAB node. The first node sends fourth indication information to a parent node of the first node after sending all the data packets from the migrating IAB node to the parent node of the first node.

The fourth indication information is similar to the third indication information. Details are not described herein again. It may be understood that the first node is the upstream IAB node of the source parent node of the migrating IAB node, and the first node may send the fourth indication information to the parent node of the first node. In this case, the parent node of the first node may determine, based on the fourth indication information, that all the data packets from the migrating IAB node are received, so that identification efficiency and accuracy can be improved.

It should be noted that when the source IAB donor DU determines that all the data packets from the migrating IAB node are received, it indicates that the upstream IAB node of the source parent node of the migrating IAB node sends all the data packets from the migrating IAB node to the source IAB donor DU. Therefore, in step S802, the source IAB donor DU may directly determine that all the data packets from the migrating IAB node are received, and IAB nodes do not need to determine one by one, so that an IAB node between the migrating IAB node and the source IAB donor DU does not determine one by one that the data packets from the migrating IAB node are received. That is, in the foregoing optional embodiment, the first node is the source IAB donor DU.

In this embodiment of this disclosure, the first indication information may indicate that the first node has determined that all the data packets from the migrating IAB node are received, may indicate that the first node has received the last data packet of all the data packets from the migrating IAB node, or may be used to request the IAB donor CU to update or release backhaul configuration information that corresponds to the migrating IAB node and that is on a backhaul link between the first node and the child node of the first node, or the like. It may be understood that, by using the first indication information, the source IAB donor CU may determine that the first node has received all the data packets from the migrating IAB node, in other words, for a backhaul link between downstream nodes of the first node, a data transmission task of the migrating IAB node has been completed, and backhaul configuration information that corresponds to the migrating IAB node and that is on a backhaul link between the first node and the downstream node may be updated or released.

Further, when the first node is the upstream IAB node of the source parent node of the migrating IAB node, backhaul configuration information that corresponds to the migrating IAB node and that is on backhaul links between nodes may be separately updated or released. Specifically, each upstream IAB node sends the first indication information to the source IAB donor CU, and after receiving the first indication information of each upstream IAB node, the source IAB donor CU sends an update or release indication to each upstream IAB node. When the first node is the source IAB donor DU, backhaul configuration information that corresponds to the migrating IAB node and that is on backhaul links between each IAB node of the upstream IAB node of the source parent node of the migrating IAB node and a child node of the IAB node and between the source IAB donor DU and a child node of the source IAB donor DU may be uniformly updated or released. Specifically, after the source IAB donor CU receives the first indication information of the source IAB donor DU, the source IAB donor CU sends an update or release indication to the source IAB donor DU and each upstream IAB node.

Step S804: The first node receives second indication information from the source IAB donor CU.

In this embodiment of this disclosure, the second indication information indicates the first node that receives the second indication information to update or release the backhaul configuration information that corresponds to the migrating IAB node and that is on the backhaul link between the first node and the child node of the first node. When the first node is the upstream IAB node of the source parent node of the migrating IAB node, the second indication information may be sent by the source IAB donor CU to the first node after the source IAB donor CU receives the first indication information from the first node. In other words, after receiving the second indication information, each upstream IAB node may separately update or release backhaul configuration information that is of the migrating IAB node and that is on a backhaul link between the node and a child node of the node. When the first node is the source IAB donor DU, the second indication information may be sent by the source IAB donor CU to the source IAB donor DU after the source IAB donor CU receives the first indication information from the source IAB donor DU. In addition, the source IAB donor CU may send update or release indication information corresponding to each upstream IAB node of the source parent node of the migrating IAB node to each upstream IAB node. In other words, the source IAB donor DU and each upstream IAB node of the source parent node of the migrating IAB node may receive one piece of fifth indication information from the source IAB donor CU based on the node. The fifth indication information indicates each upstream IAB node to update or release backhaul configuration information that is of the migrating IAB node and that is on a backhaul link between the node and a child node of the node, to uniformly update or release the backhaul configuration information of the migrating IAB node.

For example, with reference to FIG. 7, if the first node is the IAB node 1, after determining that all data packets from the IAB node 2 are received, the IAB node 1 sends the first indication information to the IAB donor CU 1. The IAB donor CU 1 sends the second indication information to the IAB node 1. Alternatively, after receiving the first indication information from the IAB donor DU 1, the IAB donor CU 1 sends the second indication information to the IAB node 1, and sends the fifth indication information to the IAB donor DU 1.

Step S806: The first node updates or releases, based on the second indication information, the backhaul configuration information that corresponds to the migrating IAB node and that is on the backhaul link between the first node and the child node of the first node.

In the method shown in FIG. 8, the first node updates or releases the backhaul configuration information in time by using the indication information, so that backhaul configuration resource utilization can be improved. In addition, the backhaul configuration information is updated or released only after all the data packets from the migrating IAB node are received, so that data loss of the IAB node during the migration can be avoided.

Figure 9:
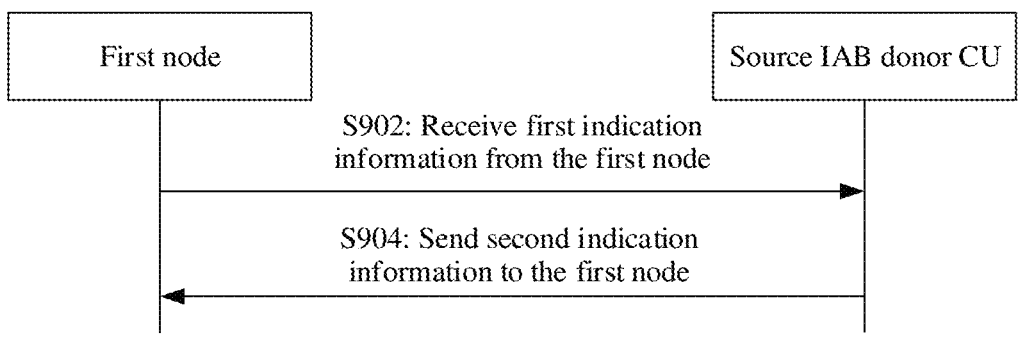
FIG. 9 is a schematic flowchart of another method for updating or releasing backhaul configuration information according to an embodiment of this disclosure.

FIG. 9 shows another method for updating or releasing configuration information according to an embodiment of this disclosure. The method is applied to a donor node. FIG. 9 uses an IAB network as an example for description. The method is specifically applied to a source IAB donor CU. The source IAB donor CU is an IAB donor CU connected to a migrating IAB node before migration. The method includes but is not limited to the following steps.

Step S902: The source IAB donor CU receives first indication information from a first node.

The first node is an upstream IAB node of a source parent node of the migrating IAB node or is a source IAB donor DU, and the source IAB donor DU is an IAB donor DU connected to the migrating IAB node before the migration. The first indication information is sent by the first node to the source IAB donor CU after the first node determines that all data packets from the migrating IAB node are received. For step S902, refer to the descriptions of step S802. Details are not described herein again.

Step S904: The source IAB donor CU sends second indication information to the first node.

In this embodiment of this disclosure, the second indication information indicates the first node that receives the second indication information to update or release backhaul configuration information that corresponds to the migrating IAB node and that is on a backhaul link between the first node and a child node of the first node. When the first node is the upstream IAB node of the source parent node of the migrating IAB node, the second indication information may be sent by the source IAB donor CU to the first node after the source IAB donor CU receives the first indication information from the first node. In other words, after receiving the second indication information, each upstream IAB node may separately update or release backhaul configuration information that is of the migrating IAB node and that is on a backhaul link between the node and a child node of the node. When the first node is the source IAB donor DU, the second indication information may be sent by the source IAB donor CU to the source IAB donor DU after the source IAB donor CU receives the first indication information from the source IAB donor DU. In addition, the source IAB donor CU may send update or release indication information corresponding to each upstream IAB node of the source parent node of the migrating IAB node to each upstream IAB node. In other words, the source IAB donor DU and each upstream IAB node of the source parent node of the migrating IAB node may receive one piece of fifth indication information from the source IAB donor CU based on the node. The fifth indication information indicates each upstream IAB node to update or release backhaul configuration information that is of the migrating IAB node and that is on a backhaul link between the node and a child node of the node, to uniformly update or release the backhaul configuration information of the migrating IAB node.

In a possible example, the first node is the source IAB donor DU, and the method further includes: The source IAB donor CU sends the fifth indication information to the upstream IAB node of the source parent node of the migrating IAB node.

The fifth indication information indicates the upstream IAB node that receives the fifth indication information to update or release backhaul configuration information that corresponds to the migrating IAB node and that is on a backhaul link between the IAB node and a child node of the IAB node.

For example, with reference to FIG. 7, if the first node is the IAB donor DU 1, after determining that all data packets from the IAB node 2 are received, the IAB donor DU 1 sends the first indication information to the IAB donor CU 1. The IAB donor CU 1 sends the second indication information to the IAB donor DU 1, and sends the fifth indication information to the IAB node 1.

As described above, the source IAB donor DU may directly determine that all the data packets from the migrating IAB node are received, and IAB nodes do not need to determine one by one. Therefore, after receiving the first indication information from the source IAB donor DU, the source IAB donor CU may send the second indication information to the source IAB donor DU, and send the fifth indication information to the upstream IAB node of the source parent node of the migrating IAB node, to uniformly update or release backhaul configuration information that corresponds to the migrating IAB node and that is on a backhaul link between each node and a child node of the node. This reduces identification time and helps improve backhaul configuration resource utilization.

It should be noted that the source IAB donor CU may further send sixth indication information to the source parent node of the migrating IAB node.

The sixth indication information indicates the source parent node of the migrating IAB node to update or release backhaul configuration information that corresponds to the migrating IAB node and that is on a backhaul link between the source parent node and the migrating IAB node. The sixth indication information may be sent after the upstream IAB node of the source parent node of the migrating IAB node sends the first indication information to the source IAB donor CU, or may be sent after the source IAB donor DU sends the first indication information to the source IAB donor CU. This is not limited herein.

For example, with reference to FIG. 7, if the first node is the IAB node 1, after determining that all data packets from the IAB node 2 are received, the IAB node 1 sends the first indication information to the IAB donor CU 1. The IAB donor CU 1 sends the second indication information to the IAB node 1, and sends the fifth indication information to the IAB node 3. Alternatively, after the IAB donor CU 1 receives the first indication information from the IAB donor DU 1, the IAB donor CU 1 sends the second indication information to the IAB donor DU 1, sends the fifth indication information to the IAB node 1, and sends the sixth indication information to the IAB node 3.

It may be understood that the source IAB donor CU may determine, based on the first indication information sent by the upstream IAB node of the source parent node of the migrating IAB node or based on the first indication information sent by the source IAB donor DU, that the source parent node of the migrating IAB node has sent all the data packets from the migrating IAB node to the parent node of the source parent node. Therefore, updating or releasing the source parent node and backhaul configuration information that corresponds to the source parent node can avoid data loss of the IAB node during migration and helps improve backhaul configuration resource utilization.

In the method shown in FIG. 9, after the first node has received all the data packets from the migrating IAB node, the source IAB donor CU receives the first indication information from the first node, and then sends, to the first node, the second indication information used to update or release the backhaul configuration information, so that the data loss of the IAB node during the migration can be avoided and the backhaul configuration resource utilization can be improved. In a possible example, the source IAB donor CU sends first routing configuration information to the first node.

The first routing configuration information includes a first BAP route identifier, and a path of the first route identifier includes a path between the migrating IAB node and a parent node of the migrating IAB node. In this way, whether the data packet is from the migrating IAB node is determined based on the BAP route identifier, so that identification efficiency and accuracy can be improved.

Figure 10:
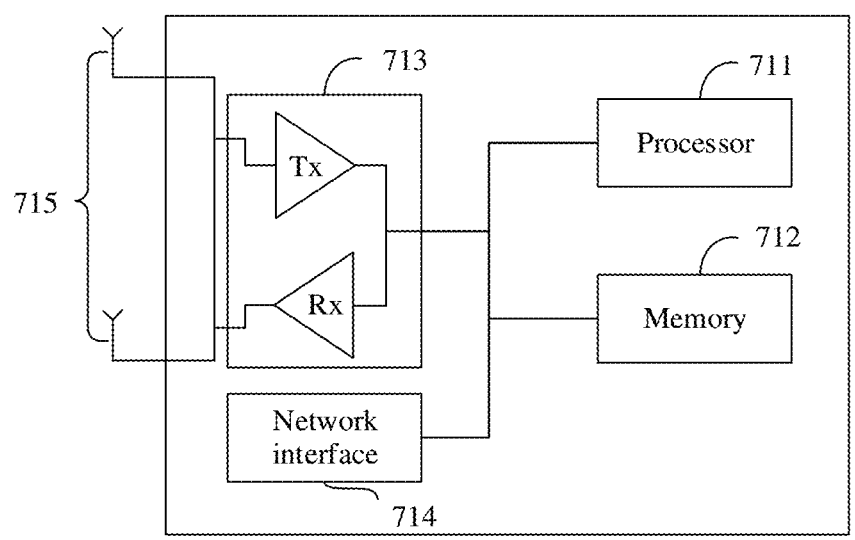
FIG. 10 is a schematic diagram of a structure of a network device according to an embodiment of this disclosure.
Figure 11:
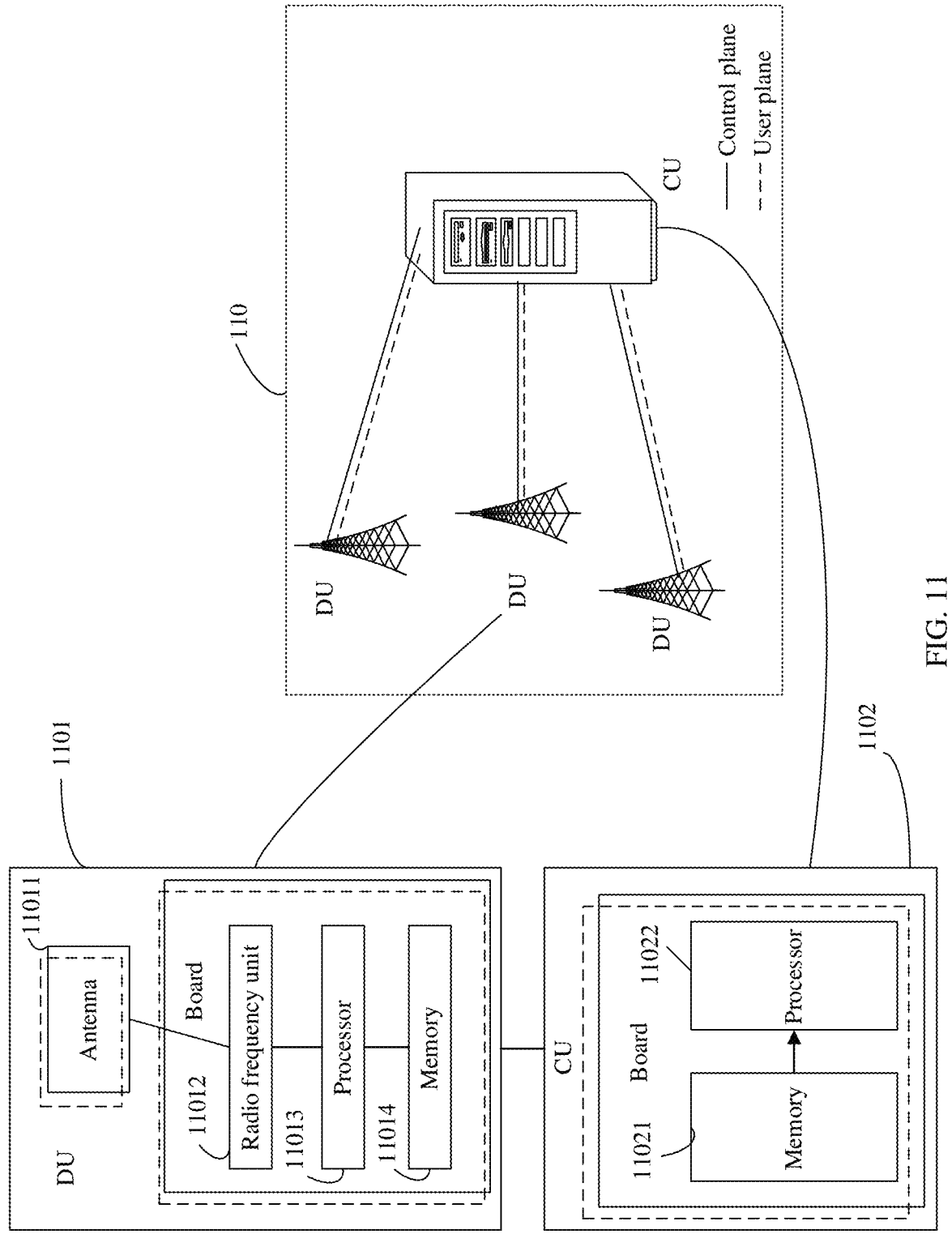
FIG. 11 is a schematic diagram of a structure of an access network device according to an embodiment of this disclosure.
Figure 12:
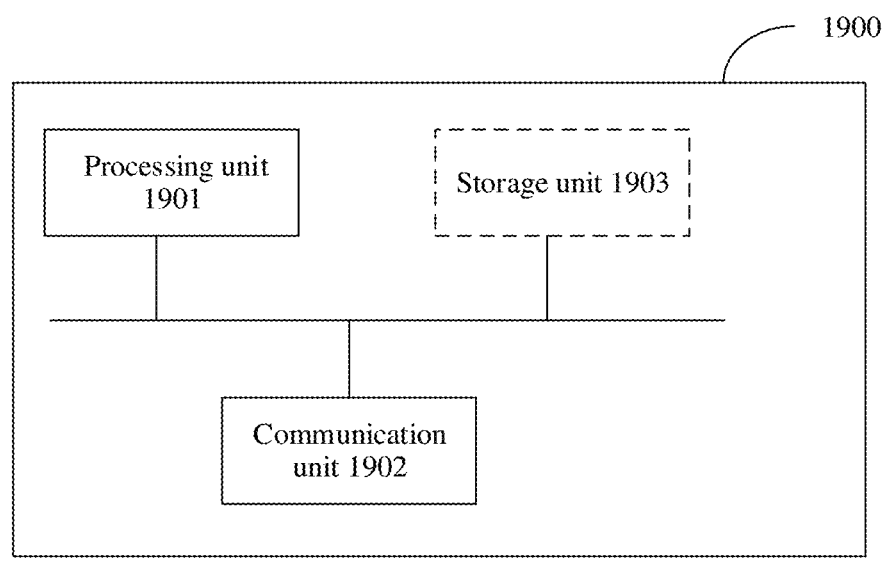
FIG. 12 is a schematic diagram of a structure of another network device according to an embodiment of this disclosure.

With reference to FIG. 10 to FIG. 12, the following describes apparatuses provided in embodiments of this disclosure. The apparatuses in FIG. 10 to FIG. 12 may complete the methods in FIG. 8 and FIG. 9. Mutual reference may be made to content of the apparatuses and content of the methods.

FIG. 10 is a schematic diagram of a structure of a network device according to an embodiment of this disclosure. The network device may be a relay node, and may implement a function of the upstream IAB node of the source parent node of the migrating IAB node in the foregoing method embodiments. Alternatively, the network device may be a donor node, and may implement a function of the source IAB donor CU or the source IAB donor DU in the foregoing method embodiments. For ease of description, FIG. 10 shows main components of the network device.

The network device includes at least one processor 711, at least one memory 712, at least one transceiver 713, at least one network interface 714, and at least one antenna 715. The processor 711, the memory 712, the transceiver 713, and the network interface 714 are connected to each other, for example, through a bus. In this embodiment of this disclosure, the connection may include various types of interfaces, transmission lines, buses, or the like. This is not limited in this embodiment. The antenna 715 is connected to the transceiver 713. The network interface 714 is configured to connect the network device to another network device through a communication link.

The transceiver 713 may be configured to perform conversion between a baseband signal and a radio frequency signal and process the radio frequency signal. The transceiver 713 may be connected to the antenna 715. The transceiver 713 includes a transmitter (Tx) and a receiver (Rx). Specifically, one or more antennas 715 may receive the radio frequency signal. The receiver Rx of the transceiver 713 is configured to: receive the radio frequency signal from the antenna, convert the radio frequency signal into a digital baseband signal or a digital intermediate frequency signal, and provide the digital baseband signal or the digital intermediate frequency signal for the processor 711, so that the processor 711 further processes the digital baseband signal or the digital intermediate frequency signal, for example, performs demodulation processing and decoding processing. In addition, the transmitter Tx of the transceiver 713 is configured to: receive a modulated digital baseband signal or a modulated digital intermediate frequency signal from the processor 711, convert the modulated digital baseband signal or the modulated digital intermediate frequency signal into a radio frequency signal, and send the radio frequency signal through the one or more antennas 715. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. Optionally, the transmitter Tx and the receiver Rx may be implemented by different physical structures/circuits, or may be implemented by a same physical structure/circuit, namely, the transmitter Tx and the receiver Rx may be inherited together.

The transceiver 713 may be referred to as a transceiver unit, a communication unit, a transceiver machine, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. In other words, the transceiver unit includes the receiving unit and the sending unit. The receiving unit may be referred to as a receiver machine, an input port, a receiver circuit, or the like. The sending unit may be referred to as a transmitter machine, a transmitter, a transmitter circuit, or the like. Alternatively, the Tx, the Rx, and the antenna may be combined into the transceiver 713.

When the network device is the relay node, the processor 711 may be configured to support the relay node in performing an action described in the foregoing method embodiments. For example, the processor 711 (for example, a baseband processor) may determine that all the data packets from the migrating IAB node are received in the foregoing method embodiments. For details, refer to content of the foregoing method embodiments.

The transceiver 713 and the antenna 715 may implement a connection between the relay node and a source donor node, and may further implement transmission with a parent node of the relay node and/or a child node of the relay node. For example, the relay node receives data sent by the child node of the relay node or data sent by a terminal, and sends data to the parent node of the relay node or sends data from the terminal. The relay node receives indication information generated by the child node from the child node of the relay node, and sends indication information generated by the relay node to the parent node of the relay node, or the like. Alternatively, for details, refer to the content of the foregoing method embodiments.

The memory 712 is mainly configured to store the software program and data. The memory 712 may exist independently, and is connected to the processor 711. Optionally, the memory 712 and the processor 711 may be integrated together, for example, integrated on a single chip, namely, an on-chip memory, or the memory 712 is an independent storage element. This is not limited in this embodiment of this disclosure. The memory 712 can store program code for executing the technical solutions in embodiments of this disclosure, and the processor 711 controls the execution. Various types of executed computer program code may be considered as drivers of the processor 711.

The memory 712 may store program code and/or data for executing an operation performed by the relay node in the foregoing method embodiments, and the processor 711 controls the execution. For example, the memory 712 may store the data and/or indication information received from the child node of the relay node, or may store the indication information generated by the relay node. For details, refer to the content of the foregoing method embodiments.

In this embodiment of this disclosure, the network device is the upstream IAB node of the source parent node of the migrating IAB node. The processor 711 is configured to determine that all the data packets from the migrating IAB node are received. The transceiver 713 is configured to send first indication information to the source IAB donor CU, and receive second indication information from the source IAB donor CU, where the source IAB donor CU is an IAB donor CU connected to the migrating IAB node before migration. The processor 711 is further configured to update or release, based on the second indication information, backhaul configuration information that corresponds to the migrating IAB node and that is on a backhaul link between the network device and a child node of the network device.

In a possible example, the processor 711 is further configured to: start or restart a first timer when the transceiver 713 receives a first data packet from the migrating IAB node; and if no other data packet from the migrating IAB node is received in a running period of the first timer, determine that all the data packets from the migrating IAB node are received.

In a possible example, the transceiver 713 is further configured to receive third indication information from the child node of the network device; and the processor 711 is further configured to determine, based on the third indication information, that all the data packets from the migrating IAB node are received.

In a possible example, the transceiver 713 is further configured to: after sending all the data packets from the migrating IAB node to a parent node of the network device, send fourth indication information to the parent node of the network device.

In a possible example, the transceiver 713 is further configured to: receive a data packet, where the data packet includes a first BAP route identifier; and receive first routing configuration information from the source IAB donor CU, where the first routing configuration information includes the first BAP route identifier, and a path of the first BAP route identifier includes a path between the migrating IAB node and the source parent node of the migrating IAB node. The processor 711 is further configured to determine, based on the first BAP route identifier and the first routing configuration information in the data packet, that the data packet is the data packet from the migrating IAB node.

In a possible example, the transceiver 713 is further configured to receive a data packet, where the data packet includes an identifier of the migrating IAB node. The processor 711 is further configured to determine, based on the identifier of the migrating IAB node, that the data packet is the data packet from the migrating IAB node.

When the network device is the donor node, the processor 711 may be configured to support execution of an action described in the foregoing method embodiments. For example, the processor 711 may determine that all the data packets from the migrating IAB node are received in the foregoing method embodiments. For details, refer to the content of the foregoing method embodiments.

The transceiver 713 and the antenna 715 may implement a connection between the donor node and the relay node, and may further implement a connection with a donor DU and a donor CU in the donor node. For example, the source IAB donor DU sends a data packet and/or indication information from the migrating IAB node to the source IAB donor CU.

A connection between the donor node and a child node may be further implemented. For example, a child node of the source IAB donor DU sends the data packet and/or indication information from the migrating IAB node to the source IAB donor CU. For details, refer to the content of the foregoing method embodiments.

The memory 712 may store program code and/or data for executing an operation performed by a source donor node in the foregoing method embodiments, and the processor 711 controls the execution. For example, the memory 712 may store data or indication information received from the child node. For details, refer to the content of the foregoing method embodiments.

The network interface 714 may include a network interface between the donor node and a core network element, for example, an S1 interface. The network interface may include a network interface between an access network device and another network device, for example, a network interface between a source donor node and a target donor node, for example, an X2 or Xn interface.

FIG. 11 is a schematic diagram of a structure of an access network device according to an embodiment of this disclosure. For example, FIG. 11 may be a schematic diagram of a structure of a donor node. A DU included in the schematic diagram may be a donor DU, and a CU included in the schematic diagram may be a donor CU. The access network device may be used in the system shown in FIG. 1, FIG. 2, FIG. 5, or FIG. 7, to perform functions of a donor node (the source IAB donor CU and/or the source IAB donor DU) in the foregoing method embodiments.

The access network device may include one or more DUs 1101 and one or more CUs 1102. The DU 1101 may include at least one antenna 11011, at least one radio frequency unit 11012, at least one processor 11013, and at least one memory 11014. The DU 1101 is mainly configured to receive and send a radio frequency signal, convert a radio frequency signal and a baseband signal, and perform some baseband processing. The CU 1102 may include at least one processor 11022 and at least one memory 11021. The CU 1102 and the DU 1101 may communicate with each other through an interface. A control plane interface may be F1-C, and a user plane interface may be F1-U.

The CU 1102 is mainly configured to perform baseband processing, control a base station, and so on. The DU 1101 and the CU 1102 may be physically disposed together, or may be physically disposed separately, in other words, in a distributed base station. The CU 1102 is a control center of the base station, or may be referred to as a processing unit, and is mainly configured to complete a baseband processing function. For example, the CU 1102 may be configured to control the base station to perform an operation procedure related to the network device in the foregoing method embodiments.

Specifically, the baseband processing of the CU and the DU may be classified based on a protocol layer of a wireless network. For details, refer to content in FIG. 3.

In addition, optionally, a donor base station 110 may include one or more radio frequency units (RUs), one or more DUs, and one or more CUs. The DU may include the at least one processor 11013 and the at least one memory 11014, the RU may include the at least one antenna 11011 and the at least one radio frequency unit 11012, and the CU may include the at least one processor 11022 and the at least one memory 11021.

In an example, the CU 1102 may include one or more boards, and the plurality of boards may jointly support a radio access network (for example, a 5G network) of a single access standard, or may separately support radio access networks (for example, an LTE network, a 5G network, or another network) of different access standards. The memory 11021 and the processor 11022 may serve one or more boards. To be specific, a memory and a processor may be separately disposed on each board, or a plurality of boards may share a same memory and a same processor. In addition, a necessary circuit may further be disposed on each board. The DU 1101 may include one or more boards, and the plurality of boards may jointly support a radio access network (for example, a 5G network) of a single access standard, or may separately support radio access networks (for example, an LTE network, a 5G network, or another network) of different access standards. The memory 11014 and the processor 11013 may serve one or more boards. To be specific, a memory and a processor may be separately disposed on each board, or a plurality of boards may share a same memory and a same processor. In addition, a necessary circuit may further be disposed on each board.

For example, when the access network device is a source donor node, a CU of the source donor node may perform transmission with a child node through a DU. For example, in a downlink direction, the CU of the source donor node may generate data (for example, PDCP data) and/or indication information and then send the data and/or indication information to the DU of the source donor node through an interface between the CU and the DU, and the DU of the source donor node sends the data to a child node of the DU through an antenna. In an uplink direction, the DU of the source donor node may receive data from the child node through the antenna, and then send the data to the CU of the source donor node through the interface between the CU and the DU.

In this embodiment of this disclosure, a network device is a source IAB donor DU, and a source IAB donor CU is an IAB donor CU connected to a migrating IAB node before migration. The processor 711 is configured to determine that all data packets from the migrating IAB node are received. The transceiver 713 is configured to send first indication information to the source IAB donor CU. The source IAB donor DU is an IAB donor DU connected to the migrating IAB node before the migration. The transceiver 713 is configured to receive second indication information from the source IAB donor CU. The processor 711 is further configured to update or release, based on the second indication information, backhaul configuration information that corresponds to the migrating IAB node and that is on a backhaul link between the network device and a child node of the network device.

In a possible example, the processor 711 is further configured to: start or restart a first timer when the transceiver 713 receives a first data packet from the migrating IAB node; and if no other data packet from the migrating IAB node is received in a running period of the first timer, determine that all the data packets from the migrating IAB node are received.

In a possible example, the transceiver 713 is further configured to receive third indication information from the child node of the network device; and determine, based on the third indication information, that all the data packets from the migrating IAB node are received.

In a possible example, the transceiver 713 is further configured to: receive a data packet, where the data packet includes a first BAP route identifier; and receive first routing configuration information from the source IAB donor CU, where the first routing configuration information includes the first BAP route identifier, and a path of the first BAP route identifier includes a path between the migrating IAB node and a source parent node of the migrating IAB node. The processor 711 is further configured to determine, based on the first BAP route identifier and the first routing configuration information in the data packet, that the data packet is the data packet from the migrating IAB node.

In a possible example, the transceiver 713 is further configured to receive a data packet, where the data packet includes an identifier of the migrating IAB node. The processor 711 is further configured to determine, based on the identifier of the migrating IAB node, that the data packet is the data packet from the migrating IAB node.

In this embodiment of this disclosure, a network device is a source IAB donor CU, and the source IAB donor CU is an IAB donor CU connected to a migrating IAB node before migration.

The transceiver 713 is configured to receive first indication information from a first node. The first node is an upstream IAB node of a source parent node of the migrating IAB node or is a source IAB donor DU. The source IAB donor DU is an IAB donor DU connected to the migrating IAB node before the migration. The first indication information is used to determine that the first node receives all data packets from the migrating IAB node. The transceiver 713 is further configured to send second indication information to the first node. The second indication information is used to update or release backhaul configuration information that corresponds to the migrating IAB node and that is on a backhaul link between the first node and a child node of the first node.

In a possible example, the first node is the source IAB donor DU, and the transceiver 713 is further configured to send fifth indication information to the upstream IAB node of the source parent node of the migrating IAB node. The fifth indication information is used to update or release backhaul configuration information that corresponds to the migrating IAB node and that is on a backhaul link between the upstream IAB node and a child node of the upstream IAB node.

In a possible example, the transceiver 713 is further configured to send first routing configuration information to the first node. The first routing configuration information includes a first BAP route identifier, and a path of the first route identifier includes a path between the migrating IAB node and a parent node of the migrating IAB node.

FIG. 12 is a schematic diagram of a structure of another network device according to an embodiment of this disclosure. The network device may perform the method described in the foregoing method embodiments. For details, refer to descriptions in the foregoing method embodiments. The network device may be used in a communication device, a circuit, a hardware component, or a chip. For example, the network device may be a chip in a relay node (for example, an upstream IAB node of a source parent node of a migrating IAB node in an IAB network) or a donor node (for example, a source IAB donor CU or a source IAB donor DU node in an IAB network).

A network device 1900 includes a processing unit 1901 and a communication unit 1902. Optionally, the network device 1900 further includes a storage unit 1903.

The processing unit 1901 may be an apparatus having a processing function, and may include one or more processors. The processor may be a general-purpose processor, a dedicated processor, or the like. The processor may be a baseband processor or a central processing unit. The baseband processor may be configured to process a communication protocol and communication data. The central processing unit may be configured to: control the apparatus (for example, a donor node, a relay node, or a chip), execute a software program, and process data of the software program.

The communication unit 1902 may be an apparatus for inputting (receiving) or outputting (sending) a signal, and is configured to perform signal transmission with another network device or another component in a device.

The storage unit 1903 may be an apparatus having a storage function, and may include one or more memories.

Optionally, the processing unit 1901, the communication unit 1902, and the storage unit 1903 are connected through a communication bus.

Optionally, the storage unit 1903 may exist independently, and is connected to the processing unit 1901 through the communication bus. The storage unit 1903 may alternatively be integrated with the processing unit 1901.

Optionally, the network device 1900 may be the chip in the relay node or the donor node in this embodiment of this disclosure. The communication unit 1902 may be an input/output interface, a pin, a circuit, or the like. The storage unit 1903 may be a register, a cache, a RAM, or the like, and the storage unit 1903 may be integrated with the processing unit 1901. The storage unit 1903 may be a ROM or another type of static storage device that can store static information and instructions, and the storage unit 1903 may be independent of the processing unit 1901.

In a possible design, the processing unit 1901 may include instructions, and the instructions may be run on the processor, to enable the network device 1900 to perform a method of a relay node or a donor node in the foregoing embodiments.

In another possible design, the storage unit 1903 stores instructions, and the instructions may be run on the processing unit 1901, to enable the network device 1900 to perform a method of a relay node or a donor node in the foregoing embodiments. Optionally, the storage unit 1903 may further store data. Optionally, the processing unit 1901 may further store instructions and/or data.

When the network device 1900 is a chip of a first node in this embodiment of this disclosure, the network device 1900 may implement a function of a first node in the foregoing method embodiments. For example, the processing unit 1901 determines that all data packets from a migrating IAB node are received, and the communication unit 1902 sends first indication information to a source IAB donor CU and receives, from a source IAB donor DU, second indication information that corresponds to the source IAB donor DU.

When the network device 1900 is a chip of a source IAB donor CU in this embodiment of this disclosure, the network device 1900 may implement a function of a source IAB donor CU in the foregoing method embodiments. For example, the communication unit 1902 may receive first indication information from a first node, and send second indication information to the first node.

When the network device 1900 is a target donor node or a chip of the target donor node in this embodiment of this disclosure, the network device 1900 may implement a function of a target donor node in the foregoing method embodiments.

For example, the processing unit 1901 may generate indication information or data generated by the target donor node in the foregoing method embodiments. For example, the communication unit 1902 may perform transmission with a child node of the target donor node, for example, send data and/or indication information to the child node, or receive data and/or indication information from the child node.

In this embodiment of this disclosure, a network device includes a first node. The first node is an upstream IAB node of a source parent node of a migrating IAB node or is a source IAB donor DU. The source IAB donor DU is an IAB donor DU connected to the migrating IAB node before migration.

The processing unit 1901 is configured to determine that all data packets from the migrating IAB node are received; and the communication unit 1902 is configured to: send first indication information to a source IAB donor CU, where the source IAB donor CU is an IAB donor CU connected to the migrating IAB node before the migration; and receive second indication information from the source IAB donor CU. The processing unit 1901 is further configured to update or release, based on the second indication information, backhaul configuration information that corresponds to the migrating IAB node and that is on a backhaul link between the first node and a child node of the first node.

In a possible example, the processing unit 1901 is further configured to: start or restart a first timer when the communication unit 1902 receives a first data packet from the migrating IAB node; and if no other data packet from the migrating IAB node is received in a running period of the first timer, determine that all the data packets from the migrating IAB node are received.

In a possible example, the communication unit 1902 is further configured to receive third indication information from the child node of the first node; and the processing unit 1901 is further configured to determine, based on the third indication information, that all the data packets from the migrating IAB node are received.

In a possible example, the first node is the upstream IAB node of the source parent node of the migrating IAB node. The communication unit 1902 is further configured to send fourth indication information to a parent node of the first node after sending all the data packets from the migrating IAB node to the parent node of the first node.

In a possible example, the communication unit 1902 is further configured to: receive a data packet, where the data packet includes a first BAP route identifier; and receive first routing configuration information from the source IAB donor CU. The first routing configuration information includes the first BAP route identifier, and a path of the first BAP route identifier includes a path between the migrating IAB node and the source parent node of the migrating IAB node. The processing unit 1901 is further configured to determine, based on the first BAP route identifier and the first routing configuration information in the data packet, that the data packet is the data packet from the migrating IAB node.

In a possible example, the communication unit 1902 is further configured to receive a data packet, where the data packet includes an identifier of the migrating IAB node. The processing unit 1901 is further configured to determine, based on the identifier of the migrating IAB node, that the data packet is the data packet from the migrating IAB node.

In this embodiment of this disclosure, a network device is a source IAB donor CU, and the source IAB donor CU is an IAB donor CU connected to a migrating IAB node before migration.

The communication unit 1902 is configured to receive first indication information from a first node. The first node is an upstream IAB node of a source parent node of the migrating IAB node or is a source IAB donor DU. The source IAB donor DU is an IAB donor DU connected to the migrating IAB node before the migration. The first indication information is used to determine that the first node receives all data packets from the migrating IAB node. The communication unit 1902 is further configured to send second indication information to the first node. The second indication information is used to update or release backhaul configuration information that corresponds to the migrating IAB node and that is on a backhaul link between the first node and a child node of the first node.

In a possible example, the first node is the source IAB donor DU. The communication unit 1902 is further configured to send fifth indication information to the upstream IAB node of the source parent node of the migrating IAB node. The fifth indication information is used to update or release backhaul configuration information that corresponds to the migrating IAB node and that is on a backhaul link between the upstream IAB node and a child node of the upstream IAB node.

In a possible example, the communication unit 1902 is further configured to send first routing configuration information to the first node. The first routing configuration information includes a first BAP route identifier, and a path of the first route identifier includes a path between the migrating IAB node and a parent node of the migrating IAB node.

The foregoing describes method flowcharts of embodiments of this disclosure. It should be understood that a relay node may have a functional unit corresponding to a method or a step of the relay node, and a source donor node (for example, a CU and/or a DU) may have a functional unit corresponding to a method or a step of the source donor node (for example, the CU and/or the DU). One or more of the foregoing modules or units may be implemented by software, hardware, or a combination thereof. When any one of the foregoing modules or units is implemented by software, the software exists in a form of computer program instructions, and is stored in a memory. A processor may be configured to execute the program instructions to implement the foregoing method procedures.

The processor in this disclosure may include but is not limited to at least one of the following types: a central processing unit (CPU), a microprocessor, a digital signal processor (DSP), a microcontroller unit (MCU), or a computing device used for running software like an artificial intelligence processor. Each computing device may include one or more cores used to execute software instructions to perform operations or processing. The processor may be a separate semiconductor chip; may be integrated with another circuit into a semiconductor chip, for example, may form a SoC (SoC) with another circuit (for example, a codec circuit, a hardware acceleration circuit, or various bus and interface circuits), or may be integrated into an application-specific integrated circuit (ASIC) as a built-in processor of the ASIC. The ASIC integrated with the processor may be packaged separately or may be packaged together with another circuit. The processor includes a core for executing software instructions to perform operation or processing, and may further include a necessary hardware accelerator, for example, a field programmable gate array (FPGA), a programmable logic device (PLD), or a logic circuit that implements a special-purpose logic operation.

The memory in embodiments of this disclosure may include at least one of the following types: a read-only memory (ROM) or another type of static storage device that can store static information and instructions, a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

In addition to a data bus, the bus may further include a power bus, a control bus, a status signal bus, and the like. However, for clear description, various types of buses in the figures are marked as the bus.

In an implementation process, the steps in the foregoing methods can be implemented by using a hardware integrated logical circuit in the processor, or by using instructions in a form of software. The steps of the method disclosed with reference to embodiments of this disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

According to the method provided in embodiments of this disclosure, an embodiment of this disclosure further provides a communication system, including the first node and the source IAB donor CU.

An embodiment of this disclosure further provides a chip system. The chip system includes at least one processor, a memory, and an interface circuit. The memory, a transceiver, and the at least one processor are interconnected through a line, and at least one memory stores instructions. When the instructions are executed by the processor, the method procedures shown in FIG. 8 and FIG. 9 are implemented.

An embodiment of this disclosure further provides a computer-readable storage medium. The computer-readable storage medium stores instructions. When the program instructions are run on a processor, the method procedures shown in FIG. 8 and FIG. 9 are implemented.

It should be further understood that first, second, third, fourth, and various numbers in this specification are merely used for differentiation for ease of description, and are not intended to limit the scope of embodiments of this disclosure. These numbers may be replaced with other numbers.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of embodiments of this disclosure.

A person of ordinary skill in the art may be aware that, in combination with illustrative logical blocks described in embodiments disclosed in this specification and steps, this disclosure may be implemented by electronic hardware or a combination of computer software and electronic hardware. Whether a function is performed by hardware or software depends on a particular application and a design constraint condition of the technical solutions. A person skilled in the art may use different methods to implement the described functions for each particular application, but it should not be considered that the implementation goes beyond the scope of this disclosure.

In the several embodiments provided in this disclosure, it should be understood that the disclosed system, apparatus, and method may be implemented in another manner. For example, the described apparatus embodiment is merely an example. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a digital versatile disc (DVD)), a semiconductor medium (for example, a solid-state drive), or the like.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication apparatus, which is a first node or included in the first node, the communication apparatus comprising: a processor coupled to a memory storing a computer program, wherein the processor is configured to execute the computer program stored in the memory, to cause the communication apparatus to perform operations comprising:

sending, after determining that all data packets from a migrating integrated access and backhaul (IAB) node are received, first indication information to a source IAB donor central unit (CU), wherein the first node is an upstream IAB node of a source parent node of the migrating IAB node or is a source IAB donor distributed unit (DU), the source IAB donor CU is an IAB donor CU connected to the migrating IAB node before migration, and the source IAB donor DU is an IAB donor DU connected to the migrating IAB node before the migration;

receiving second indication information from the source IAB donor CU; and updating or releasing, based on the second indication information, backhaul configuration information that corresponds to the migrating IAB node and that is on a backhaul link between the first node and a child node of the first node.

2. The communication apparatus according to claim 1, wherein the determining that all the data packets from the migrating IAB node are received comprises:

starting or restarting a first timer when the first node receives a first data packet from the migrating IAB node; and if the first node receives no other data packet from the migrating IAB node in a running period of the first timer, determining that all the data packets from the migrating IAB node are received.

3. The communication apparatus according to claim 1, wherein the determining that all the data packets from the migrating IAB node are received comprises:

receiving third indication information from the child node of the first node; and determining, based on the third indication information, that all the data packets from the migrating IAB node are received.

4. The communication apparatus according to claim 1, wherein the first node is the upstream IAB node of the source parent node of the migrating IAB node, and the operations further comprises:

sending additional indication information to a parent node of the first node after the first node sends all the data packets from the migrating IAB node to the parent node of the first node.

5. The communication apparatus according to claim 1, wherein the operations further comprises:

receiving a data packet, wherein the data packet comprises a first backhaul adaptation protocol (BAP) route identifier;

receiving first routing configuration information from the source IAB donor CU, wherein the first routing configuration information comprises the first BAP route identifier, and a path of the first BAP route identifier comprises a path between the migrating IAB node and the source parent node of the migrating IAB node; and determining, based on the first BAP route identifier and the first routing configuration information in the data packet, that the data packet is the data packet from the migrating IAB node.

6. The communication apparatus according to claim 1, wherein the operations further comprises:

receiving a data packet, wherein the data packet comprises an identifier of the migrating IAB node; and determining, based on the identifier of the migrating IAB node, that the data packet is the data packet from the migrating IAB node.

7. The communication apparatus according to claim 1, wherein:

the updating or releasing of the backhaul configuration information is performed only after all the data packets from the migrating IAB node are received so as to avoid data loss of the migrating IAB node during migration.

8. A communication apparatus, which is a source integrated access and backhaul (IAB) donor central unit (CU) or included in the source IAB donor CU, the communication apparatus comprising a processor is coupled to a memory storing a computer program, wherein the processor is configured to execute the computer program stored in the memory, to cause the communication apparatus to perform operations comprising:

receiving first indication information from a first node, wherein the first node is an upstream IAB node of a source parent node of a migrating IAB node or is a source IAB donor distributed unit (DU), the source IAB donor CU is an IAB donor CU connected to the migrating IAB node before migration, the source IAB donor DU is an IAB donor DU connected to the migrating IAB node before the migration, and the first indication information is used to determine that the first node receives all data packets from the migrating IAB node; and sending second indication information to the first node, wherein the second indication information is used to update or release backhaul configuration information that corresponds to the migrating IAB node and that is on a backhaul link between the first node and a child node of the first node.

9. The communication apparatus according to claim 8, wherein the first node is the source IAB donor DU and the operations further comprises:

sending additional indication information to the upstream IAB node of the source parent node of the migrating IAB node, wherein the additional indication information is used to update or release backhaul configuration information that corresponds to the migrating IAB node and that is on a backhaul link between the upstream IAB node and a child node of the upstream IAB node.

10. The communication apparatus according to claim 8, wherein the operations further comprises:

sending first routing configuration information to the first node, wherein the first routing configuration information comprises a first backhaul adaptation protocol (BAP) route identifier, and a path of the first route identifier comprises a path between the migrating IAB node and a parent node of the migrating IAB node.

11. A communication system comprising: a first node and a source integrated access and backhaul (IAB) donor central unit (CU);

wherein the first node is configured to:

send, after the first node is configured to determine that all data packets from a migrating integrated access and backhaul (IAB) node are received, first indication information to the source IAB donor CU, wherein the first node is an upstream IAB node of a source parent node of the migrating IAB node or is a source IAB donor distributed unit (DU), the source IAB donor CU is an IAB donor CU connected to the migrating IAB node before migration, and the source IAB donor DU is an IAB donor DU connected to the migrating IAB node before the migration;

receive second indication information from the source IAB donor CU; and update or release, based on the second indication information, backhaul configuration information that corresponds to the migrating IAB node and that is on a backhaul link between the first node and a child node of the first node;

wherein the source IAB donor CU is configured to:

receive the first indication information from the first node, wherein the first indication information is used to determine that the first node receives all data packets from the migrating IAB node; and send the second indication information to the first node.

12. The communication system according to claim 11, wherein the first node is further configured to:

start or restart a first timer when the first node is configured to receive a first data packet from the migrating IAB node; and if the first node is configured to receive no other data packet from the migrating IAB node in a running period of the first timer, determine that all the data packets from the migrating IAB node are received.

13. The communication system according to claim 11, wherein the first node is further configured to:

receive third indication information from the child node of the first node; and determine, based on the third indication information, that all the data packets from the migrating IAB node are received.

14. The communication system according to claim 11, wherein the first node is the upstream IAB node of the source parent node of the migrating IAB node, and the wherein the first node is further configured to:

send additional indication information to a parent node of the first node after the first node sends all the data packets from the migrating IAB node to the parent node of the first node.

15. The communication system according to claim 11, wherein the first node is further configured to:

receive a data packet, wherein the data packet comprises a first backhaul adaptation protocol (BAP) route identifier;

receive first routing configuration information from the source IAB donor CU, wherein the first routing configuration information comprises the first BAP route identifier, and a path of the first BAP route identifier comprises a path between the migrating IAB node and the source parent node of the migrating IAB node; and determine, based on the first BAP route identifier and the first routing configuration information in the data packet, that the data packet is the data packet from the migrating IAB node.

16. The communication system according to claim 11, wherein the first node is further configured to:

receive a data packet, wherein the data packet comprises an identifier of the migrating IAB node; and determine, based on the identifier of the migrating IAB node, that the data packet is the data packet from the migrating IAB node.

17. The communication system according to claim 11, wherein the first node is the source IAB donor DU and the source IAB donor CU is configured to:

send additional indication information to the upstream IAB node of the source parent node of the migrating IAB node, wherein the additional indication information is used to update or release backhaul configuration information that corresponds to the migrating IAB node and that is on a backhaul link between the upstream IAB node and a child node of the upstream IAB node.

18. The communication system according to claim 11, wherein the source IAB donor CU is configured to:

send first routing configuration information to the first node, wherein the first routing configuration information comprises a first BAP route identifier, and a path of the first route identifier comprises a path between the migrating IAB node and a parent node of the migrating IAB node.

19. The communication system according to claim 11, wherein:

the updating or releasing of the backhaul configuration information is performed only after all the data packets from the migrating IAB node are received so as to avoid data loss of the migrating IAB node during migration.

* * * * *